(12) United States Patent
Eisenhuth et al.

(10) Patent No.: US 12,466,851 B2
(45) Date of Patent: Nov. 11, 2025

(54) MANUFACTURE OF DISULFIDE BONDED PEPTIDES

(71) Applicant: BACHEM HOLDING AG, Bubendorf (CH)

(72) Inventors: Ralf Eisenhuth, Basel (CH); Daniel Samson, Leonding (AT); Ralph O. Schoenleber, Lupsingen (CH); Patrizia Marchetti, Aarau (CH)

(73) Assignee: BACHEM HOLDING AG, Bubendorf (CH)

( * ) Notice: Subject to any disclaimer, the term of this patent is extended or adjusted under 35 U.S.C. 154(b) by 757 days.

(21) Appl. No.: 17/603,826

(22) PCT Filed: Apr. 16, 2020

(86) PCT No.: PCT/EP2020/060691
§ 371 (c)(1),
(2) Date: Oct. 14, 2021

(87) PCT Pub. No.: WO2020/212477
PCT Pub. Date: Oct. 22, 2020

(65) Prior Publication Data
US 2022/0213139 A1 Jul. 7, 2022

(30) Foreign Application Priority Data
Apr. 16, 2019 (EP) .................................. 19169656

(51) Int. Cl.
| C07K 1/113 | (2006.01) |
| B01D 61/02 | (2006.01) |
| B01J 19/00 | (2006.01) |
| C07K 1/34 | (2006.01) |
| C07K 7/06 | (2006.01) |
| C07K 7/16 | (2006.01) |

(52) U.S. Cl.
CPC .......... C07K 1/1133 (2013.01); B01D 61/027 (2013.01); B01J 19/0033 (2013.01); C07K 1/34 (2013.01); C07K 7/06 (2013.01); C07K 7/16 (2013.01); *B01J 2219/00164* (2013.01); *B01J 2219/00186* (2013.01)

(58) Field of Classification Search
CPC .......... C07K 1/1133; C07K 1/34; C07K 7/06; C07K 7/16; B01D 61/027; B01J 19/0033; B01J 2219/00164; B01J 2219/00186
See application file for complete search history.

(56) References Cited

U.S. PATENT DOCUMENTS

| 4,216,141 A | 8/1980 | Rivier et al. |
| 4,530,787 A | 7/1985 | Shaked et al. |
| 5,656,721 A | 8/1997 | Albert et al. |
| 2002/0058303 A1 | 5/2002 | Swartz et al. |
| 2005/0239695 A1 | 10/2005 | Cappelletti et al. |
| 2017/0260229 A1* | 9/2017 | Ormerod ................ B01J 19/002 |
| 2019/0113483 A1 | 4/2019 | Stadelmaier et al. |

FOREIGN PATENT DOCUMENTS

| AT | 398766 B | 1/1995 |
| CN | 207596761 U | 7/2018 |
| CN | 109311960 A | 2/2019 |
| JP | S60243021 A | 12/1985 |
| JP | 2014-530891 A1 | 11/2014 |
| JP | 2015160825 A | 9/2015 |
| WO | 9501368 A1 | 1/1995 |
| WO | 2010104121 A | 9/2010 |
| WO | 2011098095 A1 | 8/2011 |
| WO | 2013/060867 A2 | 5/2013 |
| WO | 2013156600 A1 | 10/2013 |
| WO | 2016042066 A1 | 3/2016 |
| WO | 2017/196810 A1 | 11/2017 |

OTHER PUBLICATIONS

Patterson (Handbook of Industrial Mixing: Science and Practice, 2004, Ch.13, pp. 755-867) (Year: 2004).*
"Solid Phase Peptide Synthesis Bachem—Pioneering Partner for Peptides", Bachem group, Jun. 2014, Global Marketing, Bachem group.
Postma et al., "Disulfide Formation Strategies in Peptide Synthesis", European Journal of Organic Chemistry, 2014, pp. 3159-35320.
Annis et al., "Methods in Enzymology", 1997, vol. 289, pp. 198-221.
Misicka et al., "Optimization of Disulfide Bond Formation", Polish J. Chem., 1994, vol. 68, pp. 893-899.
Ormerod et al., "Cyclic Peptide Formation in Reduced Solvent Volumes via In-Line Solvent Recycling by Organic Solvent Nanofiltration", Organic Process Research and Development, 2015, vol. 19, 841-848.
Marchetti et al., "Sustainable nanotechnology and the environment: Advances and achievements", 2013, vol. 1124, pp. 121-150.
International Preliminary Report on Patentability in International Application No. PCT/EP2020/060691, dated Sep. 7, 28, 2021.

* cited by examiner

*Primary Examiner* — Sudhakar Katakam
(74) *Attorney, Agent, or Firm* — RAPHAEL BELLUM PLLC

(57) ABSTRACT

A method and apparatus for the manufacture of disulfide bonded peptides is provided, wherein a solution of an oxidizing agent and a solution of a peptide comprising at least two sulfhydryl groups are added simultaneously into a reaction vessel under such conditions that the average concentration of the oxidizing agent inside the reaction vessel is essentially zero during simultaneous addition.

16 Claims, 6 Drawing Sheets

MANUFACTURE OF DISULFIDE BONDED PEPTIDES

Figure 1:
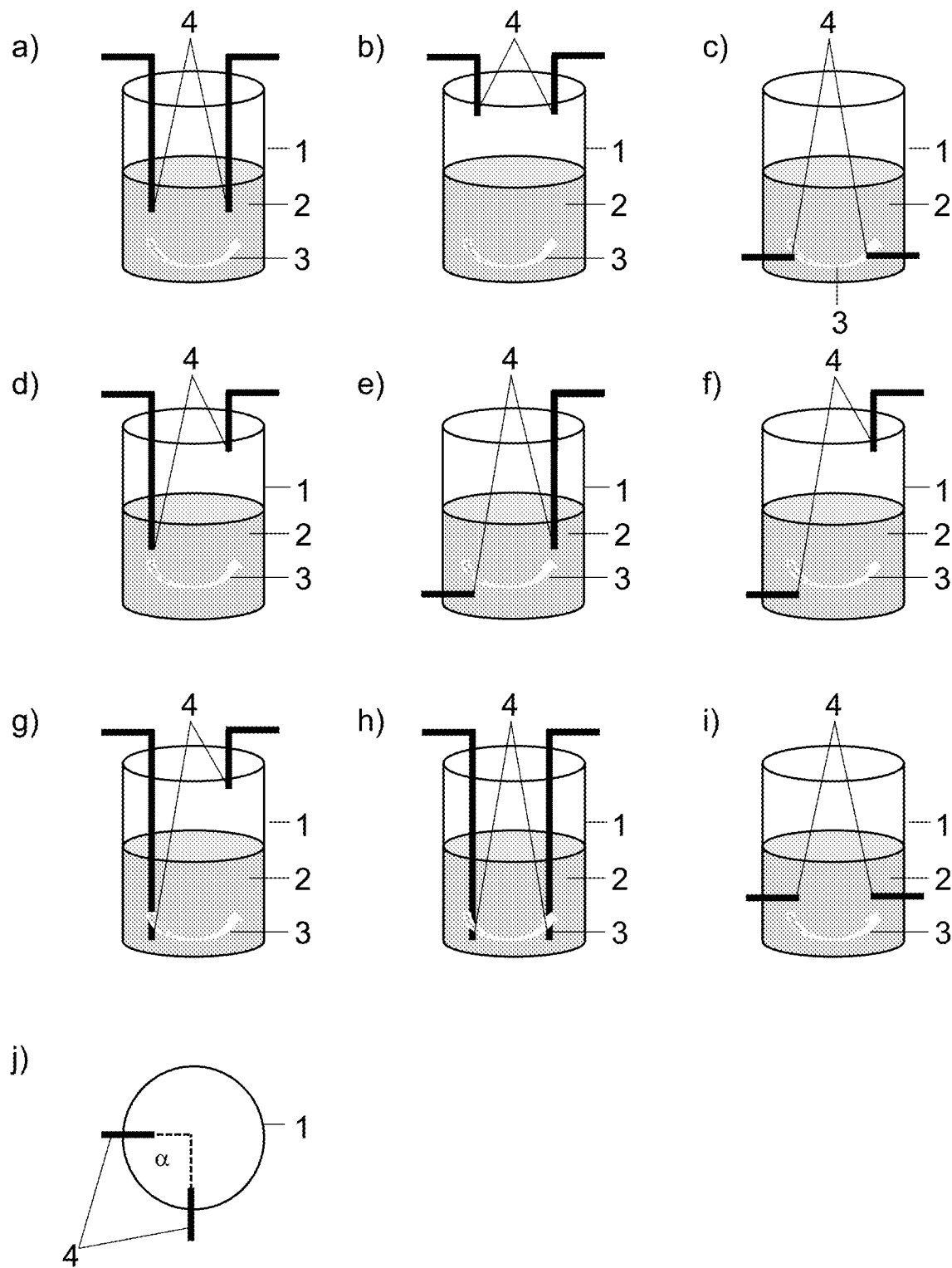

The present invention generally relates to the field of peptide synthesis at an industrial or laboratory scale. Improved methods for the preparation of peptides comprising at least one intramolecular disulfide bond, in particular for the preparation of peptides comprising one or more cysteine residues, are disclosed. The present invention is directed to methods of effectively preparing such peptides. Disulfide bonds are found in many peptides and are often crucial for peptide activity in that they stabilize the peptide's tertiary structure. Hence, the chemical synthesis of disulfide bonded peptides is of considerable commercial importance.

Chemical peptide synthesis in general is well-known in the art and usually proceeds from the peptide's C-terminus to the N-terminus (cf., brochure "Solid Phase Peptide Synthesis Bachem—Pioneering Partner for Peptides", published by Global Marketing, Bachem group, June 2014). During synthesis, formation of the peptide bond between the alpha amino group of the first amino acid and the alpha carboxyl group of a second amino acid should be favored over unintended side reactions. This is commonly achieved by the use of suitable protecting groups.

Two standard approaches to chemical peptide synthesis can be distinguished, namely Liquid Phase Peptide Synthesis (LPPS) and Solid Phase Peptide Synthesis (SPPS). In addition to LPPS and SPPS, hybrid approaches can be utilized, where fragments are first synthesized by one of the above techniques and then joined together using the other approach.

The so-called Fmoc SPPS relies on the use of 9-fluorenylmethyloxycarbonyl (Fmoc) as the temporary amino protecting group and is the most popular form of SPPS. The growing peptide chain is anchored via its C-terminal amino acid to an insoluble polymer resin. The peptide is assembled by the successive addition of the Fmoc protected amino acids constituting its sequence.

Successive cycles of amino acid addition are carried out, each consisting of: a) cleavage of the Nα-protecting Fmoc group from the resin-bound peptide, b) washing steps, c) coupling of a protected amino acid, and d) washing steps. The peptide is then usually cleaved from the solid support, protecting groups are removed, and the peptide is isolated.

Synthesis of disulfide bonded peptides typically involves first synthesis of the full length peptide sequence followed by the formation of an intramolecular disulfide bond. In this latter step, the intramolecular reaction competes with the formation of intermolecular disulfide bonds, leading to disulfide-bonded dimers and multimers as by-products. In order to suppress these unwanted side reactions, several strategies have been applied.

For example, U.S. Pat. No. 5,656,721 discloses a method involving oxidation on the SPPS resin by hydrogen peroxide prior to cleavage from the solid support. This pseudo dilution approach may, however, result in side-reactions of the disulfide bonds during the subsequent deprotection and cleavage from the solid support. Moreover, the monitoring of an on-resin oxidation is more demanding than the monitoring of an oxidation reaction in solution and the reproducibility of the approach depends crucially on achieving reproducible resin load and swelling. Alternatively, it has been reported to immobilize the oxidizing agent on a solid support (Postma and Albericio, 2014). This however, is cost intensive and may lead to the oxidation of sensitive amino acids.

The most common strategy is to perform the oxidation reaction in a very dilute solution of the peptide. An oxidizing reagent, e.g. iodine, is typically added into said peptide solution to initiate the reaction. As an alternative, U.S. Pat. No. 4,216,141 teaches a method, wherein a peptide containing at least two cysteine moieties is dissolved in an acidified aqueous solution at about 0.5 to 10 g/l and the peptide solution is added incrementally to a buffered solution containing an oxidizing agent. The addition is carried out under conditions whereby the sulfhydryl—i.e., linear peptide—concentration in the reaction mixture is maintained substantially at zero during the reaction. Likewise, Annis et al. (Methods in Enzymology, vol. 289, p. 198-221, 1997) disclose a method of disulfide bond formation, whereby a dilute peptide solution (free thiol form, 0.1-10 mM) is added slowly into a 10 mM solution of aqueous $K_3Fe(CN)_6$ under nitrogen (20% excess of oxidizing agent).

However, scalability of the above approaches is limited, because it would require the handling of impractically large volumes of the peptide solution. In cases where side reactions at the side chains of Trp or Met need to be avoided, Misicka and Hruby (Polish J. Chem., 68, 893-899, 1994) teach to add the peptide solution and the oxidant solution simultaneously and at the same rate, to a reaction mixture, so as to generate a reaction solution containing a stable, optimal proportion of both educts. In order to decrease solvent use without compromising product quality, Ormerod et al. (Org. Process Res. Dev. 2015, 19, 841-848; WO 2016/042066; WO 2013/156600) teach to use nanofiltration with recycling of the permeate after the completion of the oxidation reaction. Marchetti et al. (Sustainable nanotechnology and the environment: Advances and achievements, 2013, Vol. 1124, pages: 121-150) teach to apply membrane filtration to a peptide fragment condensation reaction.

There is still a need in the art for a simple, reliable, scalable and cost-effective method for the generation of disulfide bonded peptides, suitable for application at industrial scale.

The present inventors surprisingly found such a procedure, wherein concentrated solutions of peptide solution and oxidant solution are added simultaneously into a reaction mixture. The addition is carried out such that the oxidation reaction to form the disulfide bond occurs substantially instantaneously and the concentration of the oxidizing agent during the simultaneous addition remains substantially constant and at a level of substantially equivalent to zero. This is contrary to the teachings of the prior art, where the oxidizing agent is usually used in excess from the beginning of the reaction. In the procedure according to the present invention, the addition of oxidizing agent is continued after the addition of peptide has finished, which may result in an excess of oxidizing agent at the end of the addition. Unexpectedly and contrary to the teaching of Misicka and Hruby to avoid an excess of oxidizing agent, the present inventors did not observe excessive oxidation of Trp side chains. The methods and apparatuses of the present invention surprisingly allow generating disulfide bonded peptides of high quality and in high concentration. Without being bound by this theory, it is believed that this is achieved by precisely controlling the reaction conditions over the whole time of the oxidation reaction.

In general, several abbreviations and definitions are used throughout the present application:

Acm acetamidomethyl
Boc tert. Butyloxycarbonyl
Bzl benzyl
Dpm diphenylmethyl

DTE dithioerythriol
DTT dithiothreitol
EDT 1,2-ethanedithiol
Fmoc 9-fluorenylmethyloxycarbonyl
LPPS Liquid Phase Peptide Synthesis
Mmt methoxytrityl
Mtt methyltrityl
Phacm phenylacetamidomethyl
SPPS Solid Phase Peptide Synthesis
StBu tert. butlylmercapto
tBu tert. butyl
TFA trifluoroacetic acid
TIPS triisopropylsilane
Trt trityl.

Unless otherwise stated, pH values are indicated for the temperature at which the respective aqueous solution is to be used. Unless otherwise stated, the term "about" means deviations by plus or minus 10% of the numeric value given.

Amino acids will be referred to interchangeably by either their full name (exemplified: alanine), 3-letter code according to WIPO Standard ST. 25 (e.g. Ala), or 1-letter code (e.g. A). As far as the enantiomeric form is not expressly specified, L-amino acids are in general referred to. It should be noted, however, that the present invention can likewise be put to practice using D-amino acids and other stereoisomers.

As used herein, the term "peptide" and "polypeptide" may be understood interchangeably. Unless indicated otherwise, peptide sequences are indicated herein starting with the N-terminus (left) and ending with the C-terminus (right). A peptide is characterized by the presence of at least one peptide bond (—CO—NH—) between at least two amino acids, i.e. moieties comprising a carboxyl (—COOH) and a primary or secondary amino group (—NHR). It is therefore to be understood that the term "peptide" is not limited to peptides build from naturally occurring amino acids. It also includes, inter alia, peptide derivatives, peptides comprising non-natural amino acids, peptides comprising D-amino acids, and peptides comprising covalently or non-covalently attached linkers, dyes, or other moieties.

The term "analog" or "analogs" as used herein is used for peptides whose sequence is derived from a first peptide sequence by replacement of up to 50% of the amino acid moieties, and/or by deletion of up to 10% of the amino acid moieties of said first peptide sequence, and/or by addition of up to 10 amino acid moieties.

Preferred analogs are derived from a first peptide sequence by replacement of up to 20% of the amino acid moieties, and/or by deletion of up to 10% of the amino acid moieties of said first peptide sequence, and/or by addition of up to 10 amino acid moieties.

The term "derivative" or "derivatives" as used herein refers to a compound which can be obtained from a first compound by a chemical reaction. As a result, a derivative may differ from the first compound by the presence or absence of substituents. For example, amino acid derivatives for use in SPPS usually differ from the amino acid they are derived from at least by the presence of an amino protecting group.

The term "protecting group" as used herein may be understood in the broadest sense as a group which is introduced into a molecule by chemical modification of a functional group to block said group from reaction in subsequent process steps, e.g. to prevent side reactions of the amino acid side chains. Examples of amino protecting groups are the Boc and Fmoc groups, examples of carboxylic acid protecting groups are unreactive esters such as methyl esters, benzyl esters, or tert. butyl esters. Examples of sulfhydryl protecting groups, comprise, e.g. Acm, Phacm, Trt, Mtt, Mmt, Dpm, Bzl, tBu, and StBu protecting groups.

For the purpose of the present application, the terms "raw" and "crude" are used interchangeably to designate preparations of a peptide, which are essentially a direct product of synthesis and isolation processes and have not yet been submitted to specific purification steps. Chemical synthesis usually yields crude peptide preparations having a purity of around 40 to 80%.

In the context of the present invention, the term "purified" is used to designate peptide compositions which have been subjected to specific purification steps, e.g. to preparative chromatography. Such compositions may be highly or partially purified and may have purities of up to 100%. It should however be understood that the present invention may be advantageously applied to crude, partially purified, and purified peptide compositions.

Unless noted otherwise, peptide purity is indicated herein as "HPLC purity", i.e. as relative peak area observed in analytical reversed phase high performance liquid chromatography (RP-HPLC) with UV detection at a wavelength between 205 and 230 nm, i.e. at the absorption maximum of the peptide bond. In other words, the value is determined as % area of a given peak area divided by the sum of the areas of all observed peaks in a chromatogram obtained by analytical RP-HPLC with UV detection at a wavelength between 205 and 230 nm. This measure is common practice in the field, and the skilled person will routinely devise a product specific RP-HPLC protocol and perform the quantification, e.g. according to the established guidelines set out in the United States Pharmacopeia. The suitability of the RP-HPLC protocol for the detection of peptidic contaminations is routinely assessed by determining the peak purity by LC-MS. Under the assumption that, due to their similar structure, all peptidic components have the same absorption, the RP-HPLC purity can be used as a proxy for a purity expressed as mass percentage [% (w/w)].

The present invention is directed, inter alia, to methods for the manufacture of a peptide having at least one disulfide bond. As used herein, the expression "disulfide bond" refers to a persulfide bond (—S—S—), which is usually formed between two thiol (aka. sulfhydryl) groups by oxidation. Most commonly, peptides contain disulfide bonds formed between the side chains of two cysteine moieties. Such peptides are sometimes referred to as cysteine containing peptides. However, it is to be understood that disulfide bonds may be formed between any sulfhydryl containing moieties within the peptide molecule(s). For instance, side chains of other amino acids, such as homocysteine or penicillamine, or sulfhydryl groups from any substituents or linkers introduced into the peptide molecule may likewise be involved in the formation of disulfide bonds. Sulfhydryl groups may carry protecting group such as the Acm, Phacm, or Mmt protecting group. Preferably, the expression "sulfhydryl group" as used herein refers to a "free", i.e. unprotected sulfhydryl group (—SH).

As used herein, a peptide having at least one sulfhydryl group may be referred to as a "reduced peptide". Typically, a reduced peptide has two or more sulfhydryl groups. As used herein, a peptide having at least one disulfide bond may be referred to as an "oxidized peptide". Peptides having both at least one disulfide bond and at least one sulfhydryl group may be referred to as "oxidized", "partially oxidized", "reduced", or "partially reduced".

The present invention provides, inter alia, a method for the manufacture of a peptide having at least one intramolecular disulfide bond, the method comprising:

a) Providing a liquid reaction medium inside a reaction vessel, which vessel allows for mixing of its contents;
b) Providing a solution of a peptide, which peptide comprises at least two sulfhydryl groups;
c) Providing a solution of an oxidizing agent;
d) Simultaneously adding, via spatially separated inlets, said solution of the oxidizing agent and said solution of the peptide into said reaction medium inside the reaction vessel while mixing the vessel's contents, wherein the addition is performed such that:
  i) the concentration $C1$, which is the average concentration of said peptide in its reduced state inside the reaction vessel, is below the concentration $C0$, which is the final concentration of the peptide inside the reaction vessel at the end of peptide addition, independent of its oxidation state; and
  ii) the average concentration of oxidizing agent inside the reaction vessel is kept at essentially zero during the time of simultaneous addition of oxidizing agent and peptide;
and
e) Continuing addition of the oxidizing agent beyond the end of peptide addition.

The present invention provides, inter alia, a method for the manufacture of a peptide having at least one intramolecular disulfide bond, the method comprising:
a) Providing a liquid reaction medium inside a reaction vessel, which vessel allows for mixing of its contents;
b) Providing a solution of a peptide, which peptide comprises at least two sulfhydryl groups;
c) Providing a solution of an oxidizing agent;
d) Simultaneously adding, via spatially separated inlets, said solution of the oxidizing agent and said solution of the peptide into said reaction medium inside the reaction vessel while mixing the vessel's contents, wherein the addition is performed such that the average concentration of oxidizing agent inside the reaction vessel is kept at essentially zero during the time of simultaneous addition of oxidizing agent and peptide; and
e) Continuing the addition of the oxidizing agent beyond the end of peptide addition.

It is to be understood that the present invention can be applied to the oxidation of sulfhydryl groups protected by suitable protective groups, e.g. to a peptide comprising one free sulfhydryl group and one protected sulfhydryl group, or to a peptide comprising two sulfhydryl groups protected by a suitable protective group. In such embodiments, it is preferred that the kinetics of protecting group removal are faster than the kinetics of intermolecular disulfide bond formation. In some embodiments of the present invention, the sulfhydryl groups contained in the peptide are not protected by protecting groups, i.e. they are free sulfhydryl groups. In some embodiments of the present invention, the peptide contains at least two free sulfhydryl groups. In other embodiments of the present invention, the peptide contains at least one free sulfhydryl group.

In one embodiment, the concentration $C1$ decreases during the time of simultaneous addition of oxidizing agent and peptide in step d).

As used herein, the expression "concentration inside the reaction vessel" may be synonymous with the expression "concentration inside the liquid contained inside the reaction vessel".

As used herein, the expression "average concentration" is used to refer to the concentration of a substance inside a volume, which does result or would result from the instantaneous and homogenous distribution of said substance inside the volume. For example, the average concentration of the reduced peptide inside the reaction vessel may be calculated by dividing the molar amount of reduced peptide inside the reaction vessel by the total volume of liquid inside the reaction vessel.

The person skilled in the art will understand that the composition of the reaction medium of step a) is influenced by the properties of the peptide to be manufactured. Preferably, the reaction medium allows dissolving the reduced peptide at the concentration $C1$ or higher. The person skilled in the art will understand that the average concentration $C1$ of the reduced peptide inside the reaction vessel may be calculated by assuming instantaneous and homogenous distribution of the added peptide solution inside the liquid contained within the reaction vessel. The reduced peptide is expected to be consumed by the oxidation reaction and its concentration may fluctuate over time. The average concentration $C1$ may preferably be averaged in time over the duration of step d). Most preferably, the reaction medium allows dissolving the peptide at the concentration $C0$ or higher. $C0$ is the final concentration of the peptide inside the reaction vessel at the end of peptide addition, independent of its oxidation state. In other words, $C0$ may be defined as the maximal average concentration of the total peptide inside the liquid contained inside the reaction vessel during the oxidizing reaction. The person skilled in the art will understand that $C0$ may usually be calculated based on the concentration of the peptide solution, the volume of the peptide solution added, the volume of the solution of oxidizing agent added until the end of peptide addition, and the initial volume of the reaction medium. In cases where the content of the reaction vessel is subjected to concomitant membrane filtration, the calculation may be based on the concentration of the peptide solution added, the volume of the peptide solution added, and the final volume of the reaction mixture contained in the reaction vessel plus—where applicable—in the retentate loop.

It is preferred that the reaction medium does not react either with the oxidizing agent or with the peptide. In one embodiment, the reaction medium is essentially inert towards the oxidizing agent, the reduced peptide, and the oxidized peptide. The pH of the reaction medium is preferably chosen so as to support the disulfide bond formation and stabilize disulfide bonds. In one embodiment, the pH of the reaction medium is below 7.0, preferably below 5.0. In one embodiment, the pH of the reaction medium is below 7.0, below 6.5, below 6.0, below 5.5, below 5.0, below 4.5, below 4.0, below 3.5, or below 3.0. However, depending on the oxidation agent chosen, it may be preferable to use a reaction medium of (slightly) basic pH, e.g. of pH 7.0-8.0. The person skilled in the art will understand that the reaction medium is preferably of high polarity.

In one embodiment of the invention, the reaction medium is aqueous. In a preferred embodiment of the invention, the reaction medium is selected from the group comprising water, aqueous acetic acid, aqueous trifluoroacetic acid or aqueous formic acid. In a particularly preferred embodiment, the reaction medium is selected from the group consisting of: 0.1%, 0.2.%, 0.3%, 0.4%, 0.5%, 0.6%, 0.7%, 0.8%, 0.9%, or 1% (v/v) aqueous trifluoroacetic acid, 0.1%, 0.5%, 1%, 2%, 5%, 10%, 15%, 20%, 25%, 30%, 35%, 40%, 45%, 50%, 55%, 60%, 65%, 70%, 75%, 80%, 85%, 90%, 95%, or 100% (v/v) aqueous acetic acid, 0.1%, 0.5%, 1%, 2%, 5%, 10%, 15%, 20%, 25%, 30%, 35%, 40%, 45%, 50%, 55%, 60%, 65%, 70%, 75%, 80%, 85%, 90%, 95%, or 100% (v/v) aqueous formic acid. In other embodiments of the invention, the reaction medium may comprise the above-mentioned ingredients. In other embodiments of the invention, the reaction medium may additionally comprise one or more organic solvents such as DMF, DMSO, methanol, ethanol, isopropyl alcohol, acetic acid, dioxane, trifluoroethanol, hexafluoroisopropanol, acetonitrile tetrahydrofuran, or others. In yet other embodiments, the reaction medium may comprise or essentially consist of one or more organic solvents such as DMF, methanol, ethanol, isopropyl alcohol, acetonitrile, or others.

The term "providing a solution of a peptide, which comprises at least two sulfhydryl groups" may be understood in the broadest sense as obtaining any liquid composition containing a peptide comprising at least two sulfhydryl groups. Said peptide may be provided by any means known in the art. Exemplarily, it may be obtained from Solid Phase Peptide Synthesis (SPPS) or Liquid Phase Peptide Synthesis (LPPS) or a combination thereof. It is well known to the skilled person that oxidation of sulfhydryle groups, e.g. of cysteine residues, may lead to the formation of sulfonic acids, e.g. of cysteic acid, and needs to be avoided during peptide synthesis. This may be achieved by the use of a suitable sulfhydryle protecting group such as the diphenylmethyl, acetamidomethyl or phenylacetamidomethyl protecting group, and/or by working under protective gas, preferably by working under nitrogen. After SPPS, the peptide will usually be cleaved from the resin using a cleavage cocktail comprising TFA and one or more scavengers such as water, triisopropylsilane (TIPS), dithiothreitol (DTT), dithioerythriol (DTE), anisole, thioanisole or 1,2-ethanedithiol (EDT). For example, the cleavage cocktail may comprise 80-90% TFA, and 5 to 10% each of water, TIPS, and DTE or EDT. Other examples of cleavage cocktails include TFA/thioanisole/anisole/EDT (90:5:3:2), TFA/water/TIPS (90:5:5) v/v/v, TFA/water/phenol (90:5:5) v/v/v, TFA/EDT/H2O/TIPS (85:10:2.5:2.5) v/v/v/v, TFA/water/EDT/TIPS (90:5:2.5:2.5) v/v/v/v, TFA/water/DTE/TIPS (90:5:2.5:2.5) v/v/v/v, TFA/water/EDT/TIPS (90:4:3:3) v/v/v/v, TFA/water/EDT (90:5:5) v/v/v, TFA/DTE/H2O/TIPS 85:10:2.5:2.5 (v/w/v/v), and TFA/water/DTE (90:5:5) v/v/v. The peptide will then be commonly precipitated from the cleavage cocktail using an organic anti-solvent such as, e.g., diethyl ether, diisopropyl ether, methyl tert. butyl ether (MTBE), or mixtures of the aforementioned ethers with, e.g., acetonitrile or hexane. Alternatively, the plain polypeptide strand may also be obtained from a biotechnological method and optionally be modified by chemical/synthetic means subsequently. Preferably, the peptide is obtained from SPPS, LPPS or a combination thereof. More preferably, the peptide is obtained from a method including or consisting of Fmoc-SPPS.

In some embodiments of the present invention, the peptide contained in the solution of step b) comprises exactly two sulfhydryl groups. In further embodiments of the present invention, the peptide's sulfhydryl groups are part of cysteine side chains. In yet further embodiments, the peptide comprises exactly two cysteine moieties. Some embodiments of the present invention relate to the manufacture of a peptide selected from the group consisting of somatostatin (CAS Registry No. 38916-34-6), lanreotide (CAS registry No. 108736-35-2), octreotide (CAS registry No. 83150-76-9), dotatate (CAS registry No. 177943-88-3), edotreotide (CAS registry No. 204318-14-9), aprotinin (CAS registry No. 9087-70-1), oxytocin (CAS registry No. 50-56-6), (Arg8)-vasopressin (CAS registry No. 113-79-1), vasopressin (CAS registry No. 11000-17-2), pramlintide (CAS registry No. 151126-32-8), linaclotide (CAS registry No. 851199-59-2), ziconotide (CAS registry No. 107452-89-1), eptifibatide (CAS registry No. 188627-80-7), desmopressin (CAS registry No. 16679-58-6), calcitonin (CAS registry No. 90779-69-4), and atosiban (CAS registry No. 90779-69-4). The above names are well known to the person skilled in the art and the corresponding chemical structures/amino acid sequences can be easily and unambiguously identified. For example, the INN (international nonproprietary names) may be looked up in the lists published by the world health organization, inter alia on its homepage (https://www.who.int/). In addition, the CAS Registry No., which is an widely used and unambiguous identifier, may be used to retrieve the chemical structure of the above compounds. It is to be understood, however, that the above peptide names do not imply a restriction to a specific salt form of said peptides.

Moreover, the present invention is applicable to the manufacture of disulfide bonded derivatives and analogs of the above peptides.

It will be understood by a person skilled in the art that the peptide contained in the solution of step b) may optionally bear any counter ions known in the art, such as anions or cations, such as e.g., chloride ions, acetate ions, carbonate ions, hydrocarbonate ions, sodium ions, potassium ions, magnesium ions, bromide ions, perchlorate ions, ammonium ions, phosphate ions, or sulfate ions, any ions of the cleavage solution (e.g., TFA ions) and/or cations or anions of residuals of protecting groups. Further, the peptide may optionally be covalently or non-covalently associated to traces of one or more scavengers, such as, e.g., triisopropylsilane (TIPS), dithiothreitol (DTT), dithioerythriol (DTE), anisole, thioanisole or 1,2-ethanedithiol (EDT) or may contain traces of one or more anti-solvents such as diisopropyl ether, diethyl ether, acetonitrile, hexane, or methyl tert. butyl ether.

The solution of step b) may comprise one or more of the above-mentioned ions and compounds, as well as any adducts, polymers, or other products formed by chemical reactions of the above-mentioned compounds. In one embodiment, the solution of step b) may comprise a crude or raw peptide, which may have a purity of 30-90%, e.g. of above 30%, 40%, 50%, 60%, 70%, 80% or 90%. In some embodiments, a raw peptide having a purity of 40-80% is used. In one embodiment, the crude peptide composition has been obtained by precipitating the peptide out of a cleavage cocktail following SPPS. In one preferred embodiment, the solution of step b) may comprise a partially or highly purified peptide, i.e. a peptide composition which has been subjected to specific purification steps such as preparative chromatography.

The solution of step b) may preferably be aqueous and comprise further additives to dissolve the peptide in question. For example, the solution of step b) may be obtained by dissolving or diluting a crude or purified peptide preparation in an aqueous liquid. The aqueous liquid may for example comprise or be selected from pure water, aqueous trifluoroacetic acid [e.g. 0.05%, 0.1%, 0.2.%, 0.3%, 0.4%, 0.5%, 0.6%, 0.7%, 0.8%, 0.9%, or 1% (v/v)], aqueous acetic acid [e.g. 0.1%, 0.5%, 1%, 2%, 5%, 10%, 15%, 20%, 25%, 30%, 35%, 40%, 45%, 50%, 55%, 60%, 65%, 70%, 75%, 80%, 85%, 90%, 95%, or 100% (v/v)], aqueous formic acid [e.g. 0.1%, 0.5%, 1%, 2%, 5%, 10%, 15%, 20%, 25%, 30%, 35%, 40%, 45%, 50%, 55%, 60%, 65%, 70%, 75%, 80%, 85%, 90%, 95%, or 100% (v/v)], aqueous potassium acetate [e.g. 5 mM, 10 mM, 15 mM, 20 mM, 30 mM, 40 mM, 50 mM, 60 mM, 70 mM, 80 mM, 90 mM, 100 mM, 200 mM, or 300 mM], or aqueous sodium acetate [e.g. 5 mM, 10 mM, 15 mM, 20 mM, 30 mM, 40 mM, 50 mM, 60 mM, 70 mM, 80 mM, 90 mM, 100 mM, 200 mM, or 300 mM].

Preferably, the pH value of the solution of step b) is in the same range as the pH value of the liquid reaction medium provided in step a). In other embodiments, the solution of step b) may comprise one or more organic solvents such as DMF, methanol, isopropyl alcohol, acetonitrile, or others. In other embodiments, the solution of step b) may be obtained by dissolving or diluting a crude or purified peptide preparation in an organic solvent or in a mixture of organic solvents such as DMF, methanol, isopropyl alcohol, acetonitrile, or others. Preferably, the solution of step b) is prepared so as to minimize the content of components other than the peptide, which may react with either the liquid reaction medium provided in step a), or the oxidation agent provided in step c). Preferably, the solution of step b) is miscible with the reaction medium provided in step a).

It will be understood by a person skilled in the art that the optimal concentration of the peptide in the solution of step b) depends on the molecular properties of the peptide and the skilled person will routinely optimize this concentration. In general, the peptide concentration may be chosen so as to keep the volume of the solution of step b) low while avoiding peptide aggregation and/or precipitation. In some embodiments, the concentration of the peptide in the solution of step b) is chosen to be equal to or higher than 10, 20, 30, 40, 50, 60, 70, 80, 90, 100, 110, 120, 130, 140, 150, 160, 170, 180, 190, or 200 mmol/l. In other embodiments, the concentration of the peptide in the solution of step b) is chosen to be equal to or higher than 10, 20, 30, 40, 50, 60, 70, 80, 90, 100, 110, 120, 130, 140, 150, 160, 170, 180, 190, or 200 g/l.

The solution of step c) may preferably be miscible with the solutions of steps a) and b). It will be understood by a person skilled in the art that in principle, any oxidizing agent capable to oxidize sulfhydryl chains may be used in step c). Preferably, the oxidizing agent does not have a high propensity for side reactions such as the oxidation of methionine, tyrosine, or tryptophane side chains. Preferably, the oxidizing agent is selected from iodine, hydrogen peroxide, 2,2'-dipyridyldisulfide, dimethyl sulfoxide (DMSO), or aqueous potassium hexacyanoferrate [$K_3Fe(CN)_6$].

In one embodiment, a solution of iodine in aqueous potassium iodide is used, e.g. in a molar ratio of 1 part iodine to 3 parts potassium iodide or 1 part iodine to 3 parts sodium iodide. In other embodiments, the solution of step c) is selected from dimethyl sulfoxide in water, 2,2'-dipyridyldisulfide in isopropyl alcohol, or hydrogen peroxide in water. As used herein, the expression "oxidizing agent" relates to a chemical moiety capable to oxidize sulfhydryl groups to yield disulfide bonds. Hence, if indicating a concentration of an oxidizing agent, this concentration will refer to the concentration of the oxidizing agent in its oxidized state. The person skilled in the art will understand that the concentration of oxidation agent inside the solution of step c) depends on the desired rate of addition of oxidation agent to the reaction vessel, on the desired volume flow to the reaction vessel, and on the molecular properties of the oxidation agent. Hence, as a matter of routine work, the person skilled in the art will optimize the concentration of the oxidation agent for the specific task at hand.

In some embodiments, the concentration of the oxidation agent may be equal to or higher than 10, 20, 30, 40, 50, 60, 70, 80, 90, 100, 110, 120, 130, 140, 150, 160, 170, 180, 190, 200, 300, 400, or 500 mmol/l. Preferably, the solution of step c) is prepared so as to minimize the content of components other than the oxidation agent, which may react with either the liquid reaction medium provided in step a), or the peptide solution provided in step b). Preferably, the solution of step c) is miscible with the reaction medium provided in step a). In one embodiment, the solution of step c) is aqueous. Preferably, the pH value of the solution is chosen so as to favor suitable reaction conditions inside the reaction vessel.

It will be understood by a person skilled in the art that the volumes of the reaction medium of step a) and the solutions of steps b) and c) depend on the total amount of peptide to be oxidized and on the desired reaction conditions, in particular on the desired final concentration C0 of the peptide inside the reaction vessel at the end of the peptide addition. The person skilled in the art will routinely optimize the concentration C0 for the specific peptide to be produced. In general, it may be advantageous to keep the peptide concentration C0 as high as possible while avoiding peptide aggregation and multimer formation by reshuffling of disulfide bonds.

In some embodiments of the present invention, the concentration C0 is above 5, 10, 15, 20, 25, 30, 35, 40, 45, 50, 55, 60, 65, or 70 g/l. In some embodiments of the present invention, the concentration C0 is above 5, 10, 15, 20, 25, 30, 35, 40, 45, 50, 55, 60, 65, or 70 mM. In some embodiments of the present invention, the concentration C0 is not higher than 5, 10, 15, 20, 25, 30, 35, 40, 45, 50, 55, 60, 65, or 70 g/l. In some embodiments of the present invention, the concentration C0 is not higher than 5, 10, 15, 20, 25, 30, 35, 40, 45, 50, 55, 60, 65, or 70 mM. It will be understood by a person skilled in the art that the ratio of the concentrations C0/C1 will likewise depend on the peptide properties and the desired reaction conditions and the skilled person may optimize said ratio according to the specific task at hand. For example, the ratio C0/C1 may be at least 5, 10, 15, 20, 25, 30, 35, 40, 45, 50, 55, 65, 70, 75, 80, 85, 90, 95, 100, 110, 120, 130, 140, 150, 16, 170, 180, 190, 200, 250, 300, 400, 500, 600, 700, 800, 900, 1000, 1100, 1200, 1300, 1400 or 1500. In one embodiment, the ratio of C0/C1 is at least 10, more preferably at least 100, and most preferably at least 1000. To calculate this ratio, C1 may be averaged in time over the duration of step d).

Step d) of the method according to the present invention comprises simultaneous addition of the peptide solution and the solution of oxidizing agent into the reaction medium inside the reaction vessel. The addition is performed via spatially separated inlets while mixing the vessel's content. The person skilled in the art will understand that mixing of reaction vessel's contents may be achieved by any suitable means. For example, a stirrer comprising a rotating impeller may be used. Such an impeller may be a turbulent mixer causing axial, mixed, or radial flow of the liquid inside the reaction vessel. Known impellers include marine-type propellers, pitch-blade turbines, flat-blade turbines, and flat-blade paddles. The use of baffle blades may be helpful to improve mixing. Alternatively or in addition, mixing may be achieved by bubbling gas through the liquid. Alternatively or in addition, mixing may be achieved by liquid circulation, e.g. by means of a pumping circuit. A person skilled in the art will usually choose the mixing means so as to achieve efficient distribution of substances inside the reaction medium while avoiding foaming. The positioning of the inlets for the peptide solution and the solution of oxidizing agent may vary depending on the design of the reaction vessel and mixing means. FIG. 1 shows various designs. Generally, each of the solutions may be added either from the top of the reaction vessel (i.e. from above the surface of the reaction medium), in the middle of the reaction vessel, or from the bottom of the reaction vessel.

For example, the peptide solution and the solution of oxidizing agent may be added from the top; the peptide solution may be added from the top, while adding the solution of oxidizing agent in the middle; the peptide solution may be added from the top, while adding the solution of oxidizing agent from the bottom; the peptide solution and the solution of oxidizing agent may be added to the middle; the peptide solution may be added to the middle while adding the solution of oxidizing agent from the top; the peptide solution may be added to the middle while adding the solution of oxidizing agent from the bottom; the peptide solution may be added from the bottom while adding the solution of oxidizing agent to the middle; the peptide solution may be added from the bottom while adding the solution of oxidizing agent to the middle; the peptide solution may be added from the bottom while adding the solution of oxidizing agent from the top; or the peptide solution and the solution of oxidizing agent may be added from the bottom.

In one embodiment, only the peptide solution is added from the top. In another embodiment, only the solution of oxidizing agent is added from the top. In another embodiment, both solutions are added below the surface of the reaction medium. Moreover, the inlets may be located on the same side of the reaction vessel, on opposite sites, or in between both positions. In other words: When projecting the position of the inlets from the top of the reaction vessel as shown in panel j) of FIG. 1, both inlets may be enclosing any angle between 0° and 360°, provided that they remain spatially separated. The addition of reagent solutions into the reaction vessel will generally be performed by causing liquid flow through the respective inlets. Any technical means suitable to achieve this may be useful. For example, liquid flow may be driven by vacuum suction, by nitrogen pressure, or by means of a pump. In some embodiments of the present invention, step d) may involve initiating the flow of the solution provided in step b) into the reaction vessel before starting the flow of the solution provided in step c) into the reaction vessel. Flow control may be achieved by any means, preferably by use of a dosing pump.

Dosing the flow of the solutions of steps b) and c) into the reaction vessel may be continuous and/or controlled by feedback loops. For example, the flow of the solution of step b) and/or of the solution of step c) may be controlled based on optical properties of the liquid contained in the reaction vessel. In some embodiments, the flow of the solution of step c) is controlled by a feedback signal generated by a monitoring system inside the reaction vessel. It is noted that the monitoring system may take the form of a dip probe or of a flow cell and may be installed inside the reaction vessel itself, or—in embodiments where the reaction vessel is part of a pumping circuit—inside the recirculation loop or in a bypass to that loop. For example, photometric measurements or measurements of redox potential may provide a feedback signal regulating the flow of reagents into the reaction vessel. Such measurements and corresponding control signals may be generated, e.g., by means of transmission dip probes or redox electrodes. A redox electrode may be used to a) determine the redox potential inside the reaction vessel (and, where applicable, inside recirculation loop) during the simultaneous addition of peptide solution and oxidizing solution and to b) provide a feedback signal to the dosing pumps. Even with a complex mixture obtained when using a crude peptide preparation in the oxidation reaction, this setup surprisingly allows controlling the redox potential inside the reaction vessel such that it is at or just below the point of equivalence, where the molar amount of reducible chemical groups inside the reaction vessel corresponds to the molar amount of oxidation equivalents added. It is therefore possible to automatically control the flow of the solution of step c) based on the feedback signal obtained from the redox electrode inside the reaction mixture. In one embodiment of the invention, the flow of the solution of step c) is controlled based on a feedback signal generated by a redox electrode inside the reaction vessel and is adjusted such that, during step d) of the method, the redox potential inside the reaction vessel is just below the point of equivalence. In some embodiments of the present invention, the flow of the solutions of steps b) and c) into the reaction vessel is independently controlled and may be continuously adjusted.

In the methods according to the present invention, the addition of peptide solution and solution of oxidizing agent in step d) is performed such that the average concentration of the oxidizing agent is essentially zero, i.e. that the amount of oxidizing agent is limiting to the disulfide bond formation. Any oxidizing agent added under these conditions will be essentially immediately consumed by the oxidation reaction. In some embodiments, the average concentration of the oxidizing agent is considered to be essentially zero, as long as the average concentration of the oxidizing agent is below the limit of detection of the monitoring system used to follow the concentration or the oxidizing agent. In some embodiments, this may be achieved by controlling the color of the reaction mixture, e.g. via a dip probe. In some embodiments, when using iodine as an oxidation reagent, the concentration of the oxidation reagent inside the reaction mixture is essentially zero, as long as color of the bulk of the reaction mixture is transparent or yellow. In some embodiments, a redox electrode may be used to determine the point of equivalence and control flows so as to keep the determined potential on average at or below the point of equivalence.

The average concentration of oxidizing agent inside the reaction vessel may be considered to be essentially zero, if said average concentration is below 0.0005 equivalents/l, below 0.0004 equivalents/l, below 0.0003 equivalents/l, below 0.0002 equivalents/l, or below 0.0001 equivalents/l. It is to be understood that 1 equivalent of oxidizing agent is defined as the stoichiometric amount of oxidizing agent needed to convert the amount of peptide inside the reaction vessel at the concentration C0 from a fully reduced state to a fully oxidized state. In some embodiments of the invention, the flow of the peptide solution and the flow of the solution of oxidizing agent may be adjusted such that the concentration C1, i.e. the average concentration of reduced peptide inside the liquid contained in the reaction vessel, and the average concentration of oxidizing agent inside the liquid contained in the reaction vessel will reach a steady state during the time of simultaneous addition. In some embodiments of the present invention, the concentration C1 may decrease during the time of simultaneous addition, due to dilution by the volume of the added solutions.

In other embodiments, the flows of the peptide solution and the solution of oxidizing agent may be adjusted such that the average concentration C1 will increase over time.

Figure 2:
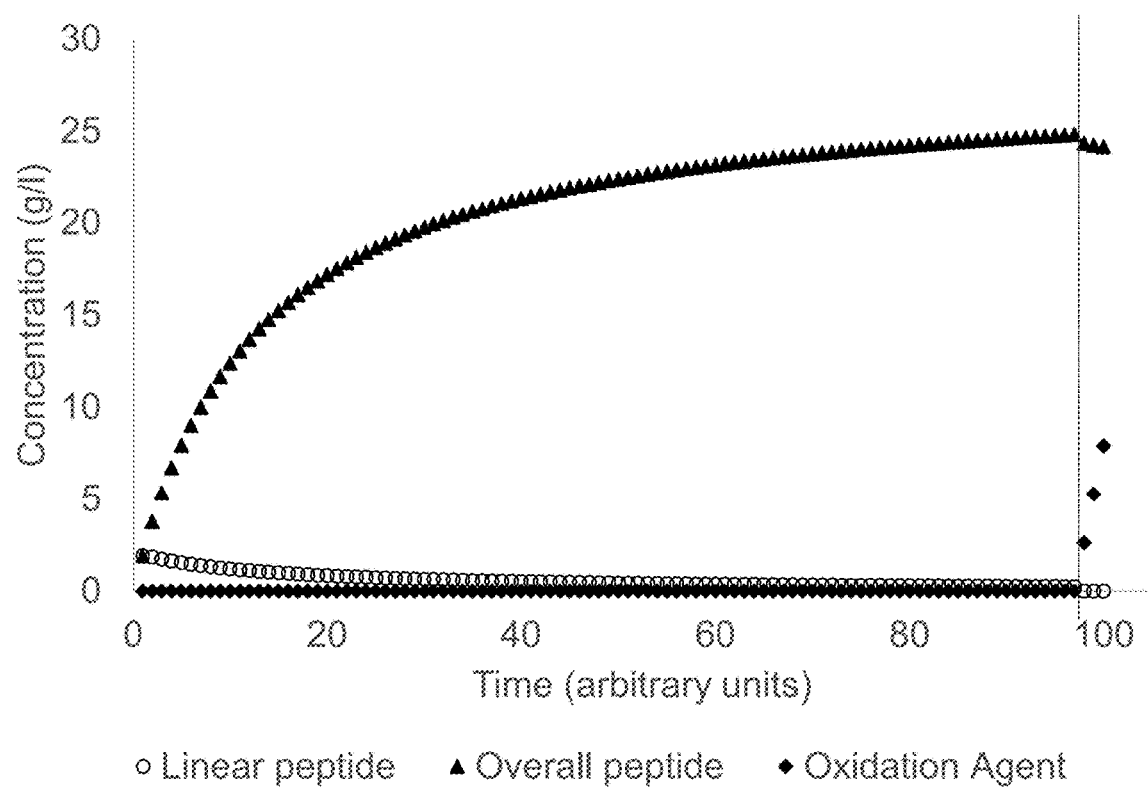

After step d), the addition of oxidizing agent continues beyond the end of peptide addition to the reaction vessel (step e). This addition may be performed while keeping the average concentration of oxidizing agent at essentially zero. In other embodiments, the addition of oxidizing agent may lead to an increase in the average concentration of oxidizing agent inside the reaction vessel above zero. FIG. 2 schematically indicates the development of the average concentrations of the reduced peptide, the total peptide, and the oxidation agent inside the reaction vessel over time according to one embodiment of the invention. In further embodiments of the present invention, the steps d) and e) are repeated at least once in alternation. In some embodiments of the present invention, the steps d) and e) are repeated at least twice, four times, six times, eight times, ten times or more than ten times in alternation.

In some embodiments of the present invention, the total amount of oxidizing agent added into the reaction vessel in steps d) and e) is chosen such that the amount of excess (i.e. unreacted) oxidizing agent contained within the reaction vessel at the end of step e) corresponds to at least 0.01 equivalents, e.g. to at least 0.005, 0.01, 0.015, 0.02, 0.025, 0.03, 0.04, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1.00 equivalents of the total amount of disulfide (i.e. —S—S—) bonds present in the completely oxidized peptide. In some embodiments of the present invention, the total amount of oxidizing agent is chosen such that the amount of excess (i.e. unreacted) oxidizing agent contained within the reaction vessel at the end of the last iteration of step e) corresponds to at least 0.01 equivalents, e.g. 0.005, 0.01, 0.015, 0.02, 0.025, 0.03, 0.04, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1.00 equivalents of the total amount of disulfide (i.e. —S—S—) bonds present in the completely oxidized peptide. In one embodiment of the present invention, the total amount of oxidizing agent added into the reaction vessel corresponds to 1.0 to 2.0 equivalents, e.g. to 0.95, 1.00, 1.01, 1.02, 1.03, 1.03, 1.04, 1.05, 1.1, 1.15, 1.20, 1.25, 1.3, 1.35, 1.4, 1.45, 1.50, 1.55, 1.60, 1.65, 1.70, 1.75, 1.80, 1.85, 1.90, 1.95, 2.00 or 2.04 equivalents, of the total amount of disulfide (i.e. —S—S—) bonds present in the fully oxidized peptide.

In one embodiment, the total amount of oxidizing agent added into the reaction vessel corresponds to 1.0 to 1.5 equivalents of the total amount of disulfide bonds present in the fully oxidized peptide. As used herein, the expression "one equivalent of the amount of disulfide bonds" is used to define the stoichiometric amount of oxidizing agent needed to generate the given amount of disulfide bonds. For example 1 mol of Iodine ($I_2$) is needed to generate 1 mol of disulfide bonds.

In further embodiments of the present invention, any excess of oxidizing reagent, which may accumulate during step e), is subsequently removed. In one embodiment of the present invention, any excess of oxidizing agent contained within the reaction vessel after the completion of step e) is removed by addition of a suitable reducing agent. The reducing agent may be added as a solid or solution into the reaction vessel. It will be understood by a person skilled in the art that a reducing agent suitable for the above purpose will reduce the oxidizing agent, but will essentially not affect the peptide's disulfide bonds. In some embodiments of the present invention, ascorbic acid or thiosulfate may be used to remove excess oxidation agent. The person skilled in the art will understand that the amount of reducing agent may preferably be adjusted to the amount of excess oxidizing reagent present. This may be achieved, e.g., by titrating the amount of reducing agent or by calculating the stoichiometric amount of reducing agent needed to reduce the expected excess of oxidizing agent.

In other embodiments of the present invention, low molecular weight species are removed from the reaction vessel's content. This may preferably be achieved by subjecting the content of the reaction vessel to membrane filtration. In one embodiment of the present invention, membrane filtration is performed continuously while carrying out steps d) and e) of the inventive methods. In one embodiment, membrane filtration is carried out (also: performed) at the same time as step d). In this embodiment, the membrane filtration may start before or after the start of step d) and end before or after the end of step d). Preferably, membrane filtration is carried out during the whole duration of step d). In one embodiment, membrane filtration is carried out during the whole duration of step d) and is continued thereafter. If continuing membrane filtration after step d), it may be used to concentrate the product solution and/or for diafiltration (i.e. salt and or solvent exchange by addition of an alternative buffer or solvent during filtration). In other embodiments, the content of the reaction vessel is subjected to membrane filtration after step e) has been concluded. In preferred embodiments, membrane filtration is used to concentrate the oxidized peptide inside the reaction vessel while removing low molecular weight species at the same time. As used herein the term "low molecular weight species" may refer to substance contained within the reaction vessel, which have a molecular weight lower than the peptide to be produced.

Membrane filtration is a pressure-driven separation process, which relies on the use of a semipermeable membrane allowing for small molecules, e.g. buffer and solvent molecules, to pass, but retaining the peptide of interest. For the purpose of the present invention, it is preferred to use membranes having a molecular weight cut-off of not more than 3 kDa, e.g. 3 kDa, 2 kDa, 1 kDa, 0.5 kDa, 0.2 kDa or below. The liquid passing through the membrane is referred to as "permeate" or "filtrate", while the sample retained by the membrane is referred to as "retentate". To avoid clogging of membrane pores, a tangential flow filtration format (aka. cross flow filtration) is advantageously employed. For example, cross-flow ultrafiltration may preferentially be used in embodiments, where the contents of the reaction vessel are mixed by means of liquid circulation.

For the purpose of the present invention, it is preferred to use membranes compatible with acids, bases, and organic solvents. In a particularly preferred embodiment, a ceramic or polymeric membrane with a molecular weight cut-off of less than 0.5 kDa is used. It should however be understood that, as long as it provides a suitable molecular weight cut-off, the filter may be of any material known in the context of filtration, such as, e.g., plastic (e.g., nylon, polystyrene), metal, alloy, glass, ceramics, metal oxides, cellophane, cellulose, or composite material. The filter may be hydrophobic or hydrophilic. The surface of the filter may be neutral or positively charged or negatively charged.

In further embodiments according to the present invention, the method further comprises the step of purifying the peptide in its oxidized state.

Preferably, the peptide may be subjected to purification after completion of step e) and optional removal of any excess oxidizing agent. Means for purification and isolation, which may optionally be used in this context, comprise, e.g., crystallization, lyophilization, one or more electrophoretic methods (e.g., gel electrophoresis or capillary (CE) electrophoresis), one or more additional precipitation-based methods (e.g., salting in or salting out), one or more dialytical methods (dialysis), and/or one or more chromatographic methods (e.g., gel permeation chromatography (GPC), size exclusion chromatography, Ion exchange chromatography (IEC), high performance liquid chromatography (HPLC), reversed phase HPLC (RP-HPLC), fast protein liquid chromatography (FPLC), Flash Chromatography (flash), Rapid Refluid Liquid Chromatography (RRLC), Rapid Separation Liquid Chromatography (RSLC), Ultra Fast Liquid Chromatography (UFLC), reversed phase UFLC (RP-UFLC), Ultra Performance Liquid Chromatography (UPLC) or reversed phase UPLC (RP-UPLC) Preferably, the oxidized peptide is subjected to at least one dimension of reversed phase HPLC.

A further aspect of the present invention relates to an apparatus suitable for performing the method according to the present invention, comprising:
 a) a reaction vessel which is equipped with a means for mixing the contents of the vessel, preferably wherein the means for mixing the contents of the vessel is a stirrer, a pumping circuit, or a stirrer and a pumping circuit;
 b) two spatially separated inlets for liquid flow into said reaction vessel;
 c) two storage vessels, each connected to one of said inlets, wherein one storage vessel contains a liquid comprising an oxidation agent and the other storage vessel contains a liquid comprising a peptide to be oxidized; and
 d) automated pumps allowing to effect and control liquid flow from the storage vessels via the inlets into the reaction vessel.

Preferably, all materials the apparatus is made of are (essentially) inert against the reagents they will be exposed to. Preferably, the material is compliant with the applicable regulations for the production of pharmaceutical products, cosmetics and/or food and beverages, i.e. it preferably complies with good manufacturing practices (GMP). Further, to minimize the risk of electrostatic ignition, an electrically conductive material may be used.

Herein, the expression "reaction vessel" or "reactor" is used for a container, which is suitable to take up the reagents of interest, and which preferably has at least one liquid outlet. The reaction vessel may be shaped so as to enable efficient mixing of its contents and rinsing of its walls. The reaction vessel will preferably be closed, i.e. suitable to avoid contamination or unintended release of its contents. The reaction vessel may comprise additional inlets and outlets for materials, preferably for liquids. Such inlets preferably comprise a valve, which is closed unless material is purposefully being introduced into or let out of the reaction vessel. Preferably, material transfer through the additional inlets and outlets is driven and controlled by automatic devices (e.g. pumps and valves) governed by a central or local control unit. The reaction vessel of the present apparatus may comprise at least two, spatially separated, liquid inlets as set out above. In one embodiment, the reaction vessel comprises at least one further inlet, which allows introducing a reducing agent into the reaction vessel, in order to remove any excess of oxidizing agent. In one embodiment, the reaction vessel comprises at least one further liquid inlet, which allows introducing a buffer/washing liquid into the reaction vessel. This latter inlet may be connected to a spray head inside the reactor.

The reaction vessel may be made of any suitable material e.g. of metals, glass, enamel, or polymers such as polypropylene, polyethylene, polyvinyl chloride, polystyrene, and poly ether ether ketone. Preferably, a material is chosen, which is essentially inert against the reagents it will be exposed to. Further, to minimize the risk of electrostatic ignition, an electrically conductive material may be used. In some embodiments, the storage vessel is made of stainless steel or Hastelloy alloys or of glass. The size and dimensions of the reaction vessel can be chosen according to the scale intended. For example, reactors with an inner volume of (about) 10 to (about) 300 liters, of (about) 20 to (about) 250 liters, of (about) 30 to (about) 200 liters, of (about) 40 to (about) 150 liters, of (about) 50 to (about) 100 liters, or of (about) 60 to (about) 75 liters may be used. For example, reactors with an inner volume of 10, 20, 30, 40, 50, 75, 100, 150, 200, or 250 liters may be used. In some embodiments, the reaction vessel has an inner volume of (about) 10 to (about) 30 liters.

The reaction vessel may be adapted for working under protective atmosphere. For example, the reaction vessel(s) may comprise a first controllable valve, which may be connected to a vacuum source, a second controllable valve, which may be connected to a source of inert gas such as nitrogen, and an electronic or mechanical pressure controller. Preferably, the valves may be operated automatically, e.g. by a central control unit. In other embodiments, the reaction vessel comprises merely a controllable valve, which can be connected to a source of inert gas such as nitrogen, and allows overlaying the vessel's liquid content with protective gas.

In order to enable temperature control, the reaction vessel may be a jacketed reactor. Preferably, a temperature sensor inside the reactor provides a feedback signal controlling the circulation of cooling or heating fluid inside the reactor's jacket.

Herein, the expression "storage vessel" may be used for a container, inside of which a material of interest can be stored under suitable conditions. The skilled person will be able to define suitable conditions depending on the circumstances, e.g. so as to preserve the material's integrity or process safety according to the specifications of a given process. The storage vessel(s) may be made of any suitable material, e.g. of metals, glass, enamel, or polymers such as polypropylene, polyethylene, polyvinyl chloride, polystyrene, and poly ether ether ketone. In some embodiments, the storage vessel is made of stainless steel or Hastelloy alloys. The size of the storage vessel may be chosen according to the scale of synthesis intended. In some embodiments, the storage vessel has an inner volume of (about) 1 to (about) 100 liters, e.g., (about) 1, 2, 5, 10, 15, 20, 25, or 30 liters. In some embodiments, the storage vessel has an inner volume of (about) 5 to (about) 20 liters.

In order to enable temperature control, the storage vessel(s) may be jacketed. Preferably, a temperature sensor inside the reactor provides a feedback signal controlling the circulation of cooling or heating fluid inside the vessel's jacket.

In some embodiments, the storage vessel may further be adapted to contain a protective gas. For example, the vessel may comprise a pressure controller, controllable valve, which can be connected to a vacuum source, and with a second controllable valve, which can be connected to a source inert gas such as nitrogen.

The storage vessels are each connected via a liquid conduit to an inlet of the reaction vessel. As has been detailed above with respect to the methods of the present invention, said inlets are spatially separated and may be positioned such that the respective reagent may be added from the top of the reactor onto the liquid comprised therein, or such that the agent may be added from below the liquid surface. Liquid flow from the storage vessels into the reaction vessel is preferably controlled by pumps, which may be referred herein as dosing pumps. The skilled person will routinely determine the dosing pumps' specifications in dependence of the dimension of the specific apparatus at hand and the anticipated concentrations of the reagents used.

In one embodiment, the apparatus may further comprise a monitoring system inside the reaction vessel, which provides a feedback signal to the dosing pump regulating the flow of the solution of oxidation agent into the reaction vessel. In one embodiment, the apparatus may further comprise a monitoring system inside the reaction vessel, which provides a feedback signal to the pump regulating the flow of the peptide solution into the reaction vessel. In one embodiment, the apparatus may further comprise a monitoring system inside the reaction vessel, which provides a feedback signal to the pump regulating the flow of the peptide solution into the reaction vessel and to the pump regulating the flow of the solution of oxidation agent into the reaction vessel. In one embodiment, the apparatus further comprises a monitoring system inside the reaction vessel, which provides a feedback signal to control at least one of the automated pumps effecting and controlling liquid flow from the storage vessels via the inlets into the reaction vessel.

In a preferred embodiment, the flow of said solution of an oxidizing agent is controlled by a feedback signal generated by a monitoring system, preferably by an oxidation reduction potential probe inside the reaction vessel, wherein the monitoring system may be preferably located in or at the reaction vessel, the retentate loop and/or a bypass loop.

In a preferred embodiment, the apparatus further comprises a monitoring system inside or attached to the reaction vessel or inside or attached to the retenate loop or inside or attached to a bypass to the retentate loop, which provides a feedback signal to control at least one of said automated pumps (6), preferably wherein said monitoring system comprises an oxidation reduction potential probe.

The monitoring system may comprise, e.g., an optical probe with a suitable spectral range, such as dip probes for UV, Vis, NIR, IR (e.g. Raman probes), or an oxidation reduction potential probe, e.g. a suitable Pt or Au electrode. As an alternative to the use of dip probes, said sensors may be in the form of a flow cell and may be integrated into the retentate loop or in a bypass loop in those embodiments, where the reaction vessel is part of a recirculation circuit. In each of the aforementioned embodiments, the monitoring system may be used to follow any parameter suitable to determine the concentration of the reduced peptide, the concentration of the total peptide, the concentration of the oxidation reagent, the concentration of any other products or educts of the oxidation reaction, and/or a ratio between any of the foregoing. In particular, specific optical properties or the redox potential of the solution inside the reaction vessel may be determined by the monitoring system. One or more monitoring systems, e.g. an optical probe and a redox probe, may be used to follow several parameters in parallel.

As used herein, the expression "redox potential" or "oxidation reduction potential" or "ORP" reflects the tendency of a solution to release or take up electrons. Redox potential may be indicated as a single voltage in millivolts (mV). It may be determined by measuring the voltage between an indicator electrode and a reference electrode. As used herein, the expressions "redox probe", "orp electrode", "redox potential probe" and "redox electrode" are used interchangeably and include configurations, where the indicator electrode and the reference electrode are build into a single piece. Such a setup may be referred to as a redox combination electrode.

In one embodiment, the monitoring system allows following the concentration of oxidizing agent inside the reaction vessel and provides feedback to the pump regulating the flow of the solution of oxidation agent into the reaction vessel. In one embodiment, the monitoring system allows following the ratio of oxidizing agent and reduced peptide inside the reaction vessel and provides feedback to the pump regulating the flow of the solution of oxidation agent into the reaction vessel. In one embodiment, the monitoring system allows following the ratio of oxidizing agent and reduced peptide inside the reaction vessel and provides feedback to the pump regulating the flow of the solution of reduced peptide into the reaction vessel. Suitable monitoring systems include, inter alia, transmission dip probes with a suitable spectral range, e.g. transmission dip probes for UV-Vis, and redox electrodes, e.g. a suitable Pt or Au electrode.

Therefore, a further aspect of the present invention relates to an apparatus suitable for performing the method according to the present invention, the apparatus comprising:

a) a reaction vessel which is equipped with a means for mixing the contents of the vessel, preferably wherein the means for mixing the contents of the vessel is a stirrer or a pumping circuit;
b) two spatially separated inlets for liquid flow into said reaction vessel;
c) two storage vessels, each connected to one of said inlets, wherein one storage vessel contains a liquid comprising an oxidation agent and the other storage vessel contains a liquid comprising a peptide to be oxidized;
d) automated pumps allowing to effect and control liquid flow from the storage vessels via the inlets into the reaction vessel; and
e) a monitoring system, which allows following the concentration of oxidizing agent inside the reaction vessel and provides a feedback signal to control at least one of said automated pumps.

As used herein, the expression "follow the concentration of a compound" is used to describe any measurement of a parameter, which parameter correlates directly or indirectly with the absolute or relative concentration of the compound in question. The monitoring system may comprise a sensor, e.g. a transmission dip probe with a suitable spectral range, such as a transmission dip probe for UV-Vis or NIR (near infra red), or a redox electrode, such as a suitable Pt or Au electrode. The monitoring system may further comprise a controller unit, which receives sensor input (actual values) and user input (target values), calculates any adjustments needed in dosing pump action, and provides an appropriate control signal to the one or more dosing pumps.

In one embodiment, the monitoring system allows following the oxidation reduction potential of the liquid inside the reaction vessel and provides feedback to the pump regulating the flow of the solution of reduced peptide into the reaction vessel and to the pump regulating the flow of the solution of oxidation agent into the reaction vessel. In one embodiment, the monitoring system allows following the oxidation reduction potential of the liquid inside the reaction vessel and provides feedback to the pump regulating the flow of the solution of reduced peptide into the reaction vessel. In one embodiment, the monitoring system allows following the oxidation reduction potential of the liquid inside the reaction vessel and provides feedback to the pump regulating the flow of the solution of oxidation agent into the reaction vessel. In some embodiments, the monitoring system comprises a platinum electrode, preferably a combined platinum electrode, such as a combined platinum ring electrode with a ceramic diaphragm.

A further aspect of the present invention therefore relates to an apparatus suitable for performing the method according to the present invention, the apparatus comprising:
  a) a reaction vessel which is equipped with a means for mixing the contents of the vessel, preferably wherein the means for mixing the contents of the vessel is a stirrer or a pumping circuit;
  b) two spatially separated inlets for liquid flow into said reaction vessel;
  c) two storage vessels, each connected to one of said inlets, wherein one storage vessel contains a liquid comprising an oxidation agent and the other storage vessel contains a liquid comprising a peptide to be oxidized;
  d) automated pumps allowing to effect and control liquid flow from the storage vessels via the inlets into the reaction vessel; and
  e) a monitoring system, which allows following the redox potential inside the reaction vessel and provides a feedback signal to control at least one of said automated pumps.

In some embodiments, the monitoring system comprises a redox potential probe, preferably a combination metal electrode, most preferably a combined platinum electrode.

Figure 3:
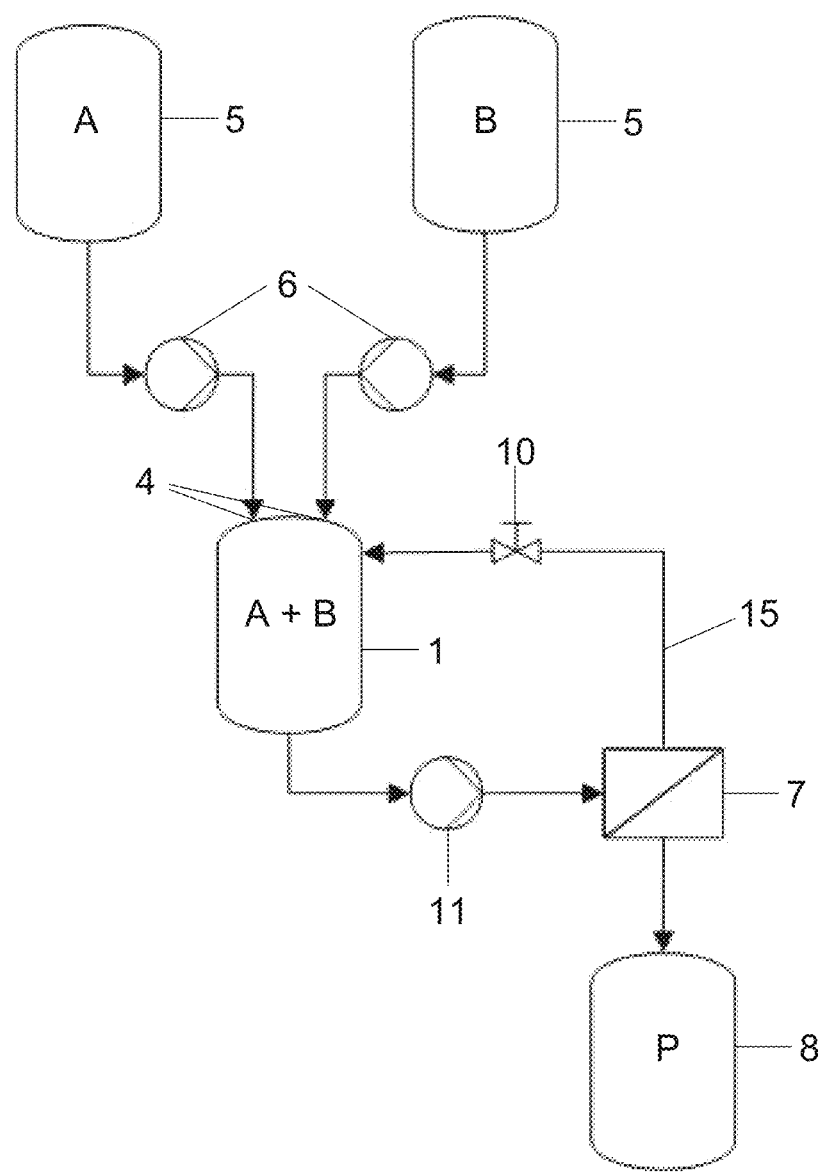
Figure 5:
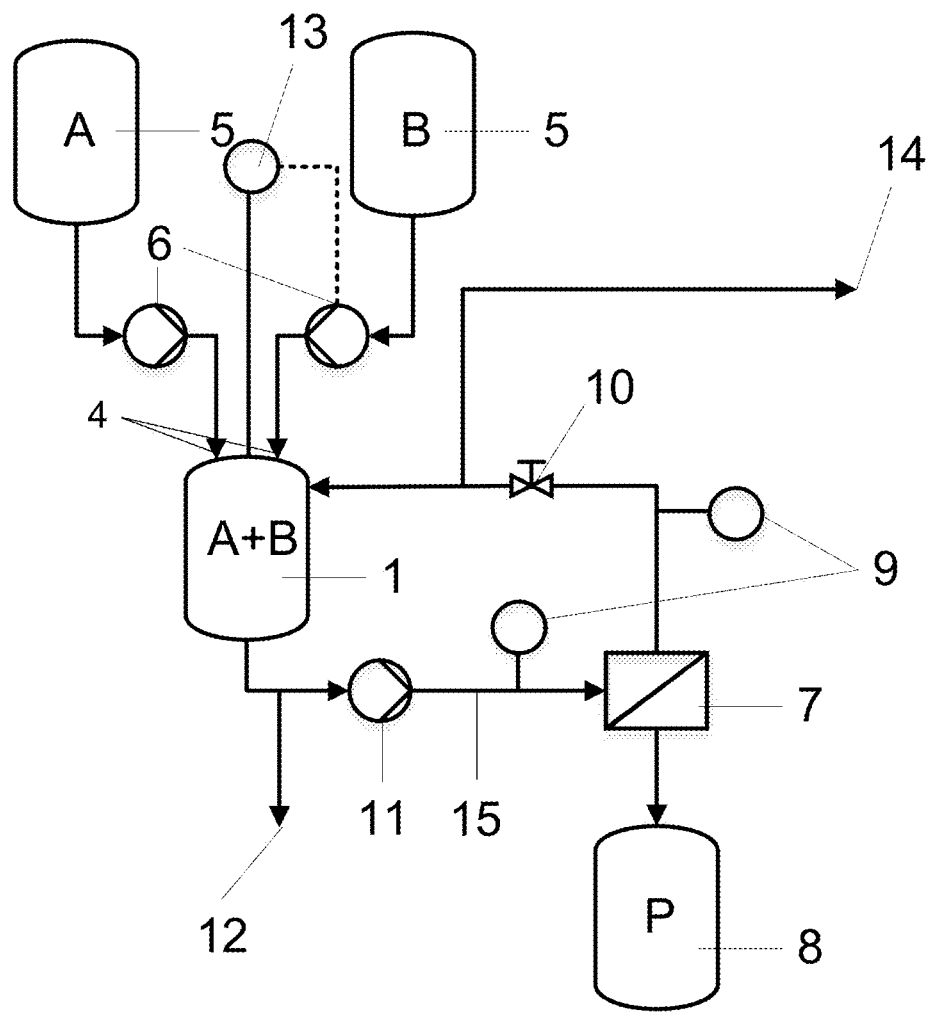

In one embodiment, the apparatus may further comprise a means for subjecting the contents of the reaction vessel to membrane filtration, e.g. by ultrafiltration or nanofiltration. Preferably, this is achieved by integrating the reaction vessel into a pumping circuit, such that liquid/retentate is circulated from the reaction vessel via a cross flow filtration unit back into the reaction vessel. Exemplary embodiments of this aspect of the invention are shown in FIGS. 3 and 5. The permeate removed from the filtration unit will preferably comprise any low molecular compounds such as buffers, scavengers, and reduced oxidation agent.

A further aspect of the present invention therefore relates to an apparatus suitable for performing the method according to the present invention, the apparatus comprising:
  a) a reaction vessel which is equipped with a means for mixing the contents of the vessel, preferably wherein the means for mixing the contents of the vessel is a stirrer or a pumping circuit;
  b) two spatially separated inlets for liquid flow into said reaction vessel;
  c) two storage vessels, each connected to one of said inlets, wherein one storage vessel contains a liquid comprising an oxidation agent and the other storage vessel contains a liquid comprising a peptide to be oxidized;
  d) automated pumps allowing to effect and control liquid flow from the storage vessels via the inlets into the reaction vessel; and
  e) a means for subjecting the contents of the reaction vessel to membrane filtration.

As used herein, the expression "subjecting the contents of the reaction vessel to membrane filtration" describes a setup, where the retentate, i.e. the peptide containing solution, is contained within or recycled to the reaction vessel. Contrary to the teachings of the prior art, the present inventors found that such a setup allows achieving complete peptide oxidation and is advantageous in that it allows improving the purity of the oxidized product. Without being bound by this theory, it is believed that this may be because such setup allows keeping i) the volume of fluid inside the reaction vessel and/or ii) the concentration of low molecular weight contaminants (essentially) constant over time.

In one embodiment, the means for subjecting the contents of the reaction vessel to membrane filtration may comprise a membrane integrated into the reaction vessel (dead-end configuration). The flow through the membrane may be driven by applying nitrogen pressure to the solution inside the reaction vessel.

In one embodiment, the means for subjecting the contents of the reaction vessel to membrane filtration may comprise a membrane filtration unit and a liquid conduit allowing to cycle liquid/retentate from the reaction vessel via the membrane filtration unit back into the reaction vessel (crossflow configuration). This liquid conduit may be referred to as a retentate loop. In one embodiment, the retentate loop emerges from an outlet of the reaction vessel and leads via the membrane filtration unit into a dedicated inlet of the reaction vessel. In another embodiment, the retentate loop emerges from an outlet of the reaction vessel and leads via the membrane filtration unit into the same reaction vessel inlet as one of the storage vessels. In this case, said storage vessel may be connected to said inlet via the retentate loop, i.e. a liquid conduit emerging from the storage vessel discharges into the retentate loop. In this latter embodiment, the flux of the retentate loop is used to pre-dilute the reagent before it enters the reaction vessel.

The flux of liquid through the retentate loop may be effected by a recirculation pump integrated into the retentate loop. The pump may preferably be dimensioned such as to ensure a linear velocity of 1 to 5 m/s on the membrane surface. The pressure inside this loop may be regulated via the pump performance and by means of a pressure control valve integrated into the retentate loop. The formation of permeate may be driven by the pressure applied to the liquid. The permeate may be discharged from the membrane filtration unit. Alternatively, the flux of liquid through the retentate loop may be effected by a recirculation pump and the pressure driving permeate formation may be obtained by applying nitrogen pressure to the reaction vessel.

The membrane filtration unit may preferably be in cross-flow configuration. The cross-flow membrane filtration unit may comprise a membrane housing, which may have one feed inlet and one outlet each for the permeate and the retentate. The membrane housing may be sealed and hold a membrane module. The skilled artisan may preferably routinely choose a suitable membrane module depending on the specifics of the oxidation reaction (e.g. the products to retain and to filter out) and the apparatus at hand. Common examples include tubular modules made of multi- or mono-channel ceramic membranes, spiral wound modules made of polymeric membranes, membrane cassettes or hollow fibres. Metal or composite membranes may likewise be used. The membrane surface area may be dimensioned in order to achieve a desired operation time.

For the purpose of the present invention, it is preferred to use membranes for nano- and ultrafiltration as has been detailed above with respect to the methods of the present invention. Membranes having a molecular weight cut-off of not more than 10 kDa, e.g. 9 kDa, 5 kDa, 3 kDa, 2 kDa, 1 kDa, 0.5 kDa, 0.2 kDa or below may be used. In a preferred embodiment, a ceramic or polymeric membrane with a molecular weight cut-off of less than 0.5 kDa is used. It should however be understood that, as long as it provides a suitable molecular weight cut-off, the membrane may be of any material known in the context of filtration, such as, e.g., polymer (e.g., nylon, polystyrene), metal, alloy, glass, ceramics, metal oxides, cellophane, cellulose, or composite material. The membrane may be hydrophobic or hydrophilic. The surface of the membrane may be neutral or positively charged or negatively charged. It is preferred to use membranes compatible with acids, bases, and organic solvents, and which are stable at the pressure and temperature used. Likewise, the housing and sealing of the membrane filtration unit are preferably stable against these influences.

To allow for temperature control within the retentate loop, the retentate loop may be equipped with a heat exchanger, such as with a shell and tube heat exchanger, a plate heat exchanger, a plate and frame heat exchanger, or a spiral plate heat exchanger. The flow of the heating/cooling medium within the heat exchanger may be in the same direction as the flow of the retentate inside the retentate loop (concurrent flow), against it (counter flow), or intersecting with it (crossflow). Hybrid configurations such as cross couterflow and multi pass flow are likewise possible. The skilled person will routinely choose a heat exchanger of suitable type and dimensions to achieve the heating/cooling needed.

Temperature control within the apparatus of the present invention may be achieved by the combined use of one or two jacketed storage vessel(s), a jacketed reaction vessel, and a heat exchanger integrated into the retentate loop. In another embodiment, temperature control within the apparatus of the present invention may be achieved by the combined use of one or two jacketed storage vessel(s) and a jacketed reaction vessel. In another embodiment, temperature control within the apparatus of the present invention may be achieved by the combined use of one or two jacketed storage vessel(s) and a heat exchanger integrated into the retentate loop. In another embodiment, temperature control within the apparatus of the present invention may be achieved by the combined use of a jacketed reaction vessel and a heat exchanger integrated into the retentate loop. These temperature control means may be chosen such that the temperature of the liquids within the apparatus may be controlled to any desired temperature selected from the range of $-10°$ C. to $50°$ C., e.g. 5 to $50°$ C. or $10°$ C. to $30°$ C., preferably with a precision of $+1-1°$ C. In another embodiment, the temperature control means may be chosen such that the temperature of the liquid within the reaction vessel may be controlled to any desired temperature selected from the range of $5°$ C. to $50°$ C.

The present apparatus may be used in a semi-continuous format as has been detailed above, where continuous feeds of peptide solution and oxidizing reagents are pumped into the reaction vessel for a certain time.

In addition to the batch-wise oxidation of a defined amount of peptide, the apparatus of the present invention may likewise be used in a truly continuous format, where the storage vessels for the peptide solution and the solution of oxidizing agent may have inlets allowing them to be permanently refilled during operation and product may be continuously removed from the retentate loop. Preferably, in such settings, the amount of oxidizing reagent is dosed such that the oxidation reduction potential of the solution inside the reaction vessel may be at or slightly above the point of equivalence, i.e. that there are equimolar amounts of reducible groups and oxidation reagent inside the reaction vessel or a slight excess of oxidation reagent over reducible groups. Preferably, the removal of product from the retentate loop may be performed by means of a liquid outlet, which is positioned in the retentate loop between the pressure control valve and the inlet into the reaction vessel. Preferably, the liquid outlet is used to continuously withdraw a certain volumetric flow of retentate from the retentate loop, which volumetric flow is small compared to that of the total recirculation flow within the reaction vessel. For example, the volumetric flow withdrawn per minute may be below 10%, e.g. below 8%, 6%, 4%, or 2%, of the total recirculation flow of liquid contained in the reaction vessel and retentate loop. The skilled person will routinely optimize the take out flow for the task at hand, depending, e.g. on the flow rate in the retentate loop and the reaction rate. This mode of action is preferable for fast reactions and system configurations, where reagents have enough residence time in the retentate loop to bring the reaction to completion before the product is taken out. This was the case for the experiment 5 shown below.

In one preferred embodiment, the feed of peptide solution removed from the retentate loop may be loaded directly onto a chromatographic column, e.g. a RP-HPLC column, preferably by means of a loading pump. In another embodiment, the feed of peptide solution removed from the retentate loop may be collected inside a storage tank. Optionally, the peptide solution removed from the retentate loop may be mixed with a solution of reducing agent in order to remove/quench any excess of oxidizing agent. The peptide collected inside the storage tank may be subjected to further purification, e.g. to chromatographic purification steps such as RP-HPLC, size exclusion chromatography, or ion exchange chromatograpy.

The apparatus of the present invention provides for numerous options to control the reaction conditions of the oxidation reaction. As has been detailed above, it enables to control the concentrations of reduced peptide, oxidizing reagent, and oxidized peptide inside the reaction vessel (e.g. by modulating the feed rate of reagents into the reaction vessel and/or the membrane filtration rate, i.e. the rate of permeate formation), the temperature (e.g. by modulating the flux of the heating/cooling medium inside vessel jackets and heat exchangers) and pressure (e.g. by controlling the recirculation pump, the pressure control valve, or the stream of nitrogen applied), and the concentration of low molecular compounds (e.g. by modulating the membrane filtration rate, i.e. the rate of permeate formation). Preferably, the regulation of said parameters is performed by one or more automated devices, which receive input from appropriate sensors inside the reaction vessel or inside the recirculation loop. Preferably, said sensors comprise pressure sensors, temperature sensors, and one or more sensors selected from the group of a conductivity probe, a redox probe, and an optical probe (e.g. a UV-Vis probe or a NIR probe).

The automated controlling devices may be local or be part of a central control unit. Said central control unit may be organized to form different hierarchical levels of control, as may be the case for a supervisory control and data acquisition (SCADA) control system architecture. For example, the control unit may comprise one or more remote supervisory computers, which gather data from and send control commands to peripheral devices, and one or more peripheral devices such as remote terminal units (RTU), programmable logic controllers (PLC) and user interfaces such as GUI panels. The PLCs and the supervisory SCADA software may receive input from field sensors such as sensors of temperature, pressure, oxidation reduction potential, or conductivity, amongst others. The one or more SCADA supervisory computing platform may additionally interact with a manufacturing execution system (MES), which in turn interacts with an enterprise resource planning (ERP) system. Moreover, the one or more SCADA supervisory computing platform may execute logging tasks by sending specific process parameters to a dedicated database. In some embodiments, the control unit comprises at least one SCADA system, at least one PLC with sensors and actors controlling the actions of the dosing pumps, the recirculation pump, and the pressure control valve. In some embodiments, the control unit further controls the efflux of product from the retentate loop, the draining of liquid from the reaction vessel, the influx of additional reagents, e.g. of reducing agent or of buffer/washing liquid, into the reaction vessel, and the flow of heating/cooling fluid through vessel jackets and/or the retentate loop's heat exchanger. In some embodiments, the control unit may further control the flow of protective gas (e.g. of nitrogen) into the reaction vessel and the mixing device(s) of the reaction vessel.

In some embodiments, the control devices may be adjusted so as to keep the volume of liquid in the reaction vessel and the recirculation loop constant within a certain range. The skilled person will immediately recognize that, under this condition, the feed flows, the filtration rate and the rate of retentate removal (if applicable) will be interdependent. For instance, an increase of oxidation equivalents inside the reduction vessel may be regulated by reducing the influx of oxidizing agent while compensating for this by either reducing the filtration rate and/or by increasing the influx of peptide solution and/or by dosing a buffer solution into the reaction vessel. Likewise, if the concentration of small molecular contaminants comprised in the peptide solution builds up, this may be compensated by increasing the filtration rate while dosing an amount of buffer solution into the reaction vessel. The skilled person will determine which parameters are particularly influential for a specific oxidation reaction at hand and will configure the system so as to control them.

The following aspects relate to particularly preferred embodiments of the present apparatus. The reference signs given in brackets are for illustration only and are not to be construed as limiting In a first aspect, the present apparatus comprises
a) a reaction vessel (1), which is equipped with a means for mixing the contents of the vessel, preferably wherein the means for mixing the contents of the vessel is a stirrer or a pumping circuit;
b) two spatially separated inlets (4) for liquid flow into said reaction vessel;
c) two storage vessels (5), each connected to one of said inlets, wherein one storage vessel contains a liquid comprising an oxidation agent and the other storage vessel contains a liquid comprising a peptide to be oxidized;
d) automated pumps (6) allowing to effect and control liquid flow from the storage vessels via the inlets into the reaction vessel; and
e) a means for subjecting the contents of the reaction vessel to membrane filtration.

In a second aspect, the means for subjecting the contents of the reaction vessel to membrane filtration comprises or corresponds to a membrane filtration unit (7) and a retentate loop (15) allowing to cycle liquid from the reaction vessel to a membrane filtration unit and back into the reaction vessel.

In a third aspect, the membrane filtration unit (7) according to the second aspect is a cross-flow filtration unit, preferably wherein the membrane filtration unit comprises a membrane housing with a nanofiltration membrane module with a molecular weight cut-off of less than 0.5 kDa.

In a fourth aspect, the retentate loop (15) of the apparatus according to the second aspect further comprises a recirculation pump (11) and a pressure control valve (10).

In a fifth aspect, the apparatus according to any of the previous aspects further comprises at least one temperature control means, which is/are selected from the group consisting of a jacketed storage vessel, a jacketed reaction vessel or a heat exchanger integrated into the retentate loop (15).

In a sixth aspect, the reaction vessel (1) of the apparatus according to any of the previous aspects further comprises an additional liquid inlet, preferably wherein the liquid inlet allows feeding buffer or washing medium into the reaction vessel.

In a seventh aspect, the apparatus according to any of the previous aspects further comprises a sensor (13) inside the reaction vessel, which provides a feedback signal to control at least one of said automated pumps.

In an eighth aspect, the sensor according to the seventh aspect is selected from an optical sensor and an oxidation reduction potential probe, preferably wherein the sensor is a combination metal electrode, most preferably a combined platinum electrode.

In a ninth aspect, the apparatus according to the seventh or the eighth aspect further comprises a controller unit, which receives input from said sensor inside the reaction vessel and provides a control signal to the one or more dosing pumps. In a tenth aspect, the apparatus according to any of the previous aspects further comprises at least one sensor selected from a temperature sensor, a pressure sensor, or an optical sensor inside the reaction vessel (1), inside the retentate loop (15) or in a bypass to the retentate loop.

In an eleventh aspect, the apparatus according to any of the previous aspects further comprises a central control unit, which receives input from the sensors and controls the actions of the pumps, the pressure inside the apparatus and optionally the pressure inside the apparatus.

It should be noted that the previous explanations and descriptions of embodiments of the process according to the present invention are likewise applicable to the apparatus according to the present invention, and vice versa.

The following Figures and Examples, including the experiments conducted and the results achieved are provided for illustrative purposes only and are not to be construed as limiting to the scope of the claims.

DETAILED DESCRIPTION OF THE FIGURES

FIG. 1 shows various positions of inlets for the solutions containing the reduced peptide and the oxidizing agent into the reaction vessel. Panels a) to i) show the reaction vessel from the side view, panel j) gives a top view illustrating the (imaginary) angle α enclosed between both inlets. Panels a) to i) illustrate the possible positions of the inlets (4) with respect to the surface of the reaction medium (2), which is mixed by a mixing means (3).

FIG. 2 is a simulation of the changes in the concentrations of reduced peptide (empty circles), total peptide (black triangles), and oxidizing agent (black romboids) inside the reaction vessel over time during steps d) and e) in one embodiment of the inventive method. The dashed line indicates the initiation of step e).

FIG. 3 shows one embodiment of an apparatus according to the present invention, where the reaction vessel (1) is connected to a pumping circuit including a membrane filtration unit. Solutions of the reduced peptide and of the oxidizing agent (A,B) are fed via spatially separated inlets (4) into the reaction vessel (1). The reaction vessel (1) may comprise a mixer (not shown). The content of the reaction vessel (1) is subjected to membrane filtration by means of a retentate loop (15) cycling the liquid from an outlet of the reaction vessel (1) via a cross-flow filtration unit (7) back into the reaction vessel (1). Liquid flow and pressure within the retentate loop are driven and controlled by a recirculating pump (11) and a pressure control valve (10). The permeate formed (P) is drained from the membrane filtration unit (7) into a permeate tank (8).

Figure 4:
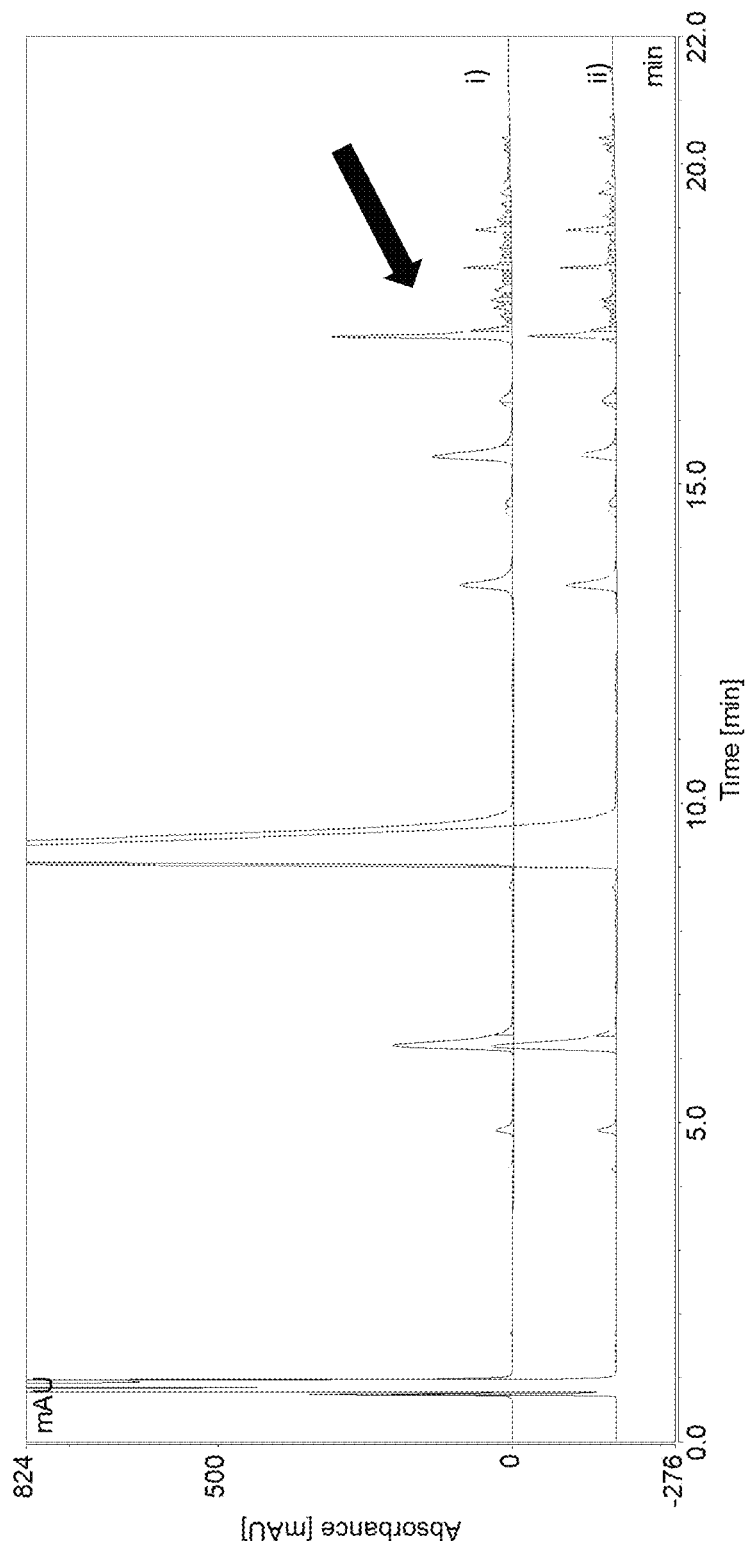

FIG. 4 shows analytic HPLC traces of a peptide oxidized according to comparative Example 2 (trace i) and of the same peptide oxidized according to Example 3 (trace ii). It can be seen that the peptide oxidized according to the present invention (trace ii) contains significantly fewer disulfide-bonded oligomers. (cf. region highlighted by arrow).

FIG. 5 shows another embodiment of the present apparatus, where the apparatus of FIG. 3 is further complemented by a monitoring system (13) providing a feedback signal to the dosing pump controlling reagent flow from storage vessel B into the reaction vessel. The retentate loop contains two pressure sensors (9) allowing to monitor the pressure before and after the nanofiltration unit. A liquid drain (12) allows emptying the system. A line (14) connected to a liquid outlet within the retentate loop allows continuously withdrawing product from the retentate loop. Flux within this line may be driven by a pump integrated into this line (not shown).

Figure 6:
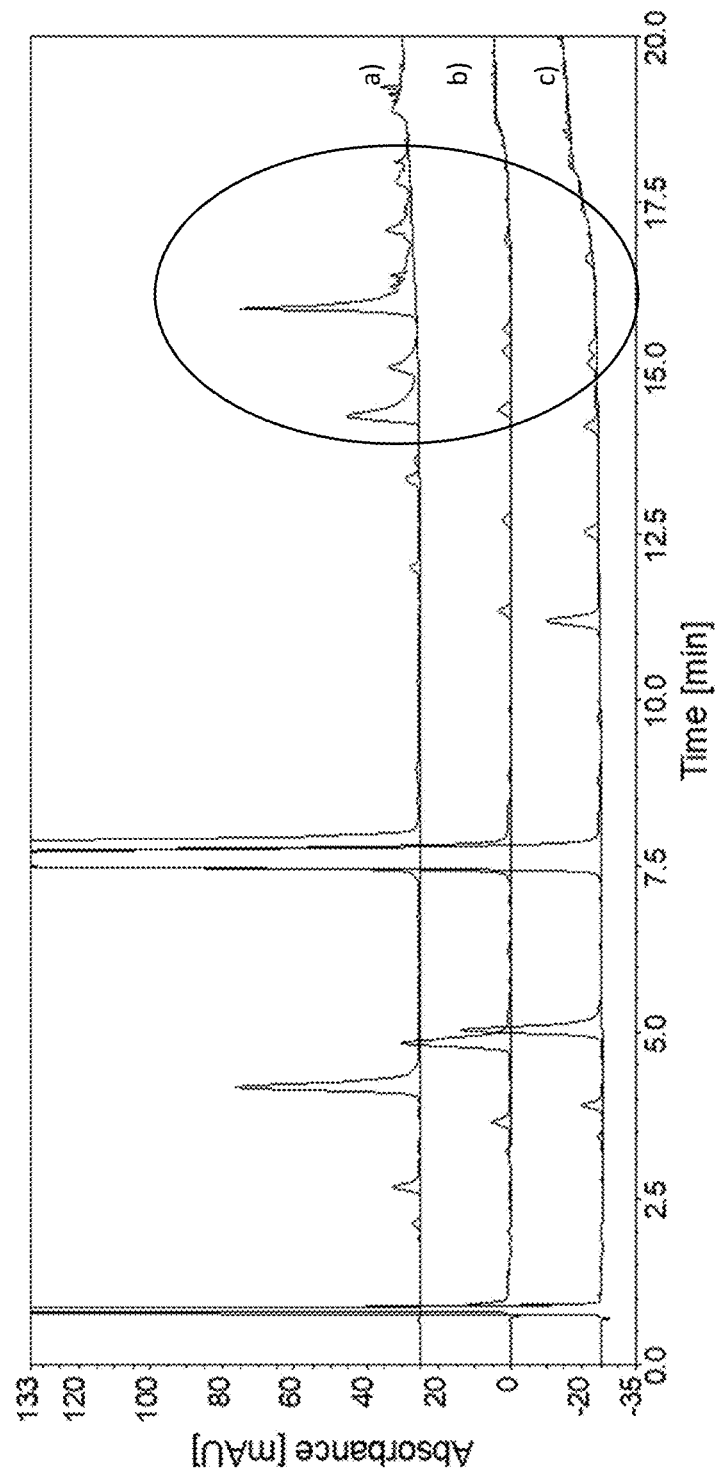

FIG. 6 shows analytic HPLC traces of a peptide oxidized according to Example 3 (trace a) and of the same peptide oxidized according to Example 5.1, short run (trace b) and Example 5.2, long run (trace c). It can be seen that the peptide oxidized according to the present invention Example 5 contains significantly fewer contaminations of high molecular weight, which are expected to be oligomers (see region highlighted by oval shape).

LIST OF REFERENCE SIGNS 1 reaction vessel
2 reaction medium
3 mixing means
4 liquid inlets
5 storage vessel
6 liquid pump for dosing
7 membrane filtration unit
8 vessel for permeate
9 pressure sensor
10 pressure control valve
11 liquid pump for recirculation
12 liquid drain
13 feedback sensor and controlling device
14 line for continuous take out
15 retentate loop

EXAMPLES

General Methods

Peptide 1 [H-D-Phe-Cys-Phe-D-Trp-Lys-Thr-Cys-L-threoninol] and peptide 2 [(Deamino-Cys$^1$,D-Tyr(Et)$^2$,Thr$^4$,Orn$^8$)-Oxytocin] were synthesized by SPPS using standard methods and Fmoc-amino acid derivatives. Peptide cleavage and concomitant cleavage of protecting groups was performed using cleavage cocktails comprising at least 80% TFA, water, and scavengers. The raw peptide was precipitated from the cleavage cocktail using diisopropyl ether as anti-solvent.

Comparative Example 1: Oxidation of Peptide 1

Raw peptide 1 produced according to the general procedure was dissolved in 30% acetic acid and diluted with 5% aqueous acetonitrile to a final peptide concentration of 1.3 g/l. A 0.01M solution of iodine in water was slowly added to the peptide solution. After completion of the reaction, unreacted iodine was reduced by addition of ascorbic acid. The final peptide concentration obtained was 0.95 g/l, with a purity of the oxidized peptide of 90% as determined by analytical RP-HPLC.

Comparative Example 2: Oxidation of Peptide 1

A solution of 0.069M iodine in 0.207M aqueous potassium iodide was added continuously to 110 ml of stirred 30% aqueous acetic acid. A solution of raw peptide 1 in 30% aqueous acetic acid (50 g/l) was added continuously via a locally separated inlet. During the simultaneous addition, the reaction mixture was brownish red, demonstrating that the average concentration of iodine was above zero. After completion of the oxidation reaction, excessive iodine was quenched by addition of ascorbic acid and the reaction product was analyzed by analytical RP-HPLC. The content of disulfide bonded oligomers was found to be 12.03%. The final peptide concentration obtained was 17.5 g/l.

Example 3: Oxidation of Peptide 1

Raw peptide 1 produced according to the general procedure was dissolved in 30% aqueous acetic acid to a concentration of 50 g/l. The solution was added continuously to 110 ml of stirred 30% aqueous acetic acid. A solution of 0.069M iodine in 0.207M aqueous potassium iodide was added continuously via a locally separated inlet. During the simultaneous addition, the reaction mixture was slightly yellow, demonstrating that the average concentration of iodine was essentially zero. The color of the reaction mixture changed to brownish red, when the addition of iodine solution was continued beyond peptide addition. After completion of the oxidation reaction, excessive iodine was quenched by addition of ascorbic acid and the reaction product was analyzed by analytical RP-HPLC. The content of disulfide bonded oligomers was found to be 7.63%. The final peptide concentration obtained was 17.5 g/l. Hence, as is illustrated in FIG. 4, the method according to the present invention allows reducing the amount of disulfide bonded oligomers to 63% compared to the prior art method of Example 2. Moreover, the concentration of oxidized peptide obtained is considerably higher than with the prior art method of Example 1.

Example 4: Oxidation of Peptide 2

Raw peptide produced according to the general procedure was dissolved in 60% aqueous acetic acid to a concentration of 100 g/l. The solution was added continuously to a stirred solution of acetic acid. At the same time, a solution of 0.075M iodine in 0.227M aqueous potassium iodide was added via a locally separated inlet. During said simultaneous addition, the reaction mixture was slightly yellow, demonstrating that the average concentration of iodine was essentially zero. The color of the reaction mixture changed to brown, when the addition of iodine solution was continued beyond peptide addition. Excessive iodine was quenched by addition of ascorbic acid and the reaction product analyzed by analytical RP-HPLC. The final peptide concentration obtained was 27.8 g/l.

Example 5: Oxidation of Peptide 1 with Nanofiltration

Raw peptide 1 produced according to the general procedure was dissolved in 30% aqueous acetic acid at a concentration of 50 g/L. A solution of 0.052M iodine in 0.159 M aqueous potassium iodide was prepared. The two solutions were filled into a first and a second storage vessel, respectively. The storage vessels were connected via locally separated inlets to a stirred reaction vessel. Said reaction vessel functioned as the feed tank of a nanofiltration system, which further comprised a retentate loop with pressure sensors and a pressure control valve, a recirculation pump, and a nanofiltration unit with a ceramic monochannel membrane (filtration area of 0.0104 m$^2$). The basic layout of the apparatus used is illustrated FIG. 3. The reaction vessel and the retentate loop of the nanofiltration system were filled with 2 L of 30% aqueous acetic acid.

The oxidation reaction was started by adding the solution of the crude peptide and the iodine solution simultaneously into the reaction vessel. During the simultaneous addition, the reaction mixture was slightly yellow, demonstrating that the average concentration of iodine was essentially zero. The addition of the iodine solution was continued beyond peptide addition. Liquid circulation within the nanofiltration system was started before initiating the reagent flow into the reaction vessel and was maintained during the time of reagent addition. The pressure in the retentate loop was set at 23 bar. Samples of permeate and retentate were taken at regular time points, quenched by addition of ascorbic acid (0.5 mL sample+50 µL 0.5M ascorbic acid) and then analyzed by analytical RP-HPLC. After completion of the oxidation reaction, the nanofiltration system was depressurized and drained to recover the retentate. The retentate was quenched by addition of ascorbic acid and the reaction product was analyzed by analytical RP-HPLC.

5.1 Short Run

Overall operating time ca. 2.2 h. The final peptide concentration obtained was 5 g/L, with a purity of 92.59%. The content of disulfide bonded oligomers was found to be lower than 5%.

5.2 Long Run

Overall operating time ca. 9 h. The final peptide concentration obtained was 20 g/L, with a purity of 90.44%. The content of disulfide bonded oligomers was found to be lower than 5%.

No linear peptide was detected in the permeate.

Hence, as is illustrated in FIG. 6, the method according to the present invention allows further reducing the amount of disulfide bonded oligomers remarkably compared to the method of Example 3. Moreover, the concentration of oxidized peptide obtained is higher than with the prior art methods of Examples 1 to 4 and can be increased further by adjusting the operation of the nanofiltration system.

The invention claimed is:

1. A method for the manufacture of a peptide having at least one intramolecular disulfide bond, the method comprising:
   a) providing a liquid reaction medium inside a reaction vessel, which vessel allows for mixing of its contents;
   b) providing a solution of a peptide, which peptide comprises at least two sulfhydryl groups;
   c) providing a solution of an oxidizing agent;
   d) simultaneously adding, via spatially separated inlets, the solution of the oxidizing agent and the solution of the peptide into the reaction medium inside the reaction vessel while mixing the vessel's contents, wherein the addition is performed such that:
      i) the concentration C1, which is the average concentration of the peptide in its reduced state inside the reaction vessel, is below the concentration C0, which is the final concentration of the peptide inside the reaction vessel at the end of peptide addition, independent of its oxidation state; and
      ii) the average concentration of oxidizing agent inside the reaction vessel is kept at essentially zero during the time of simultaneous addition of oxidizing agent and peptide; and
   e) continuing addition of the oxidizing agent beyond the end of peptide addition, while keeping the concentration of the oxidizing agent at essentially zero;
   wherein steps d) and e) are repeated at least once in alternation.

2. The method according to claim 1, wherein the total amount of oxidizing agent added into the reaction vessel corresponds to 1.0 to 1.5 equivalents of the total amount of disulfide bonds present in the fully oxidized peptide.

3. The method according to claim 1, further comprising the step of removing any excess of oxidizing agent contained within the reaction vessel after the completion of step e).

4. The method according to claim 1, wherein the mixing of the content of the reaction vessel is achieved by a stirrer, by gas bubbles, by liquid circulation or any combination thereof.

5. The method according to claim 1, wherein low molecular weight species are removed from the content of the reaction vessel.

6. The method according to claim 5, wherein membrane filtration is carried out at the same time as step d).

7. The method according to claim 1, wherein the flow of the solution of an oxidizing agent is controlled by a feedback signal generated by a monitoring system.

8. The method according to claim 1, further comprising the step of purifying the peptide in its oxidized state.

9. The method according to claim 1, wherein the oxidizing agent is selected from the group consisting of iodine, hydrogen peroxide, dimethyl sulfoxide, 2,2'-dipyridyldisulfide, and aqueous potassium hexacyano-ferrate (III).

10. The method according to claim 1, wherein the pH of the reaction medium is below 7.0.

11. The method according to claim 1, wherein the sulfhydryl groups are part of cysteine side chains and/or wherein the peptide comprises exactly two sulfhydryl groups and/or wherein the peptide is selected from the group consisting of somatostatin, lanreotide, octreotide, dotatate, edotreotide, aprotinin, oxytocin, (Arg8)-vasopressin, vasopressin, linaclotide, ziconotide, eptifibatide, desmopressin, pramlintide, calcitonin, and atosiban.

12. The method according to claim 1, wherein the ratio of C0/C1 is at least 10 during step d).

13. The method according to claim 3, wherein removal is effected by addition of a suitable reducing agent.

14. The method according to claim 1, wherein low molecular weight species are removed from the content of the reaction vessel by membrane filtration.

15. The method according to claim 1, wherein the flow of the solution of an oxidizing agent is controlled by a feedback signal generated by a monitoring system by an oxidation reduction potential probe inside the reaction vessel.

16. The method according to claim 1, wherein the flow of the solution of an oxidizing agent is controlled by a feedback signal generated by a monitoring system by an oxidation reduction potential probe inside the reaction vessel, wherein the monitoring system is located in or at the reaction vessel, a retentate loop and/or a bypass loop.

* * * * *